US 6,320,973 B2

(12) United States Patent
Suzaki et al.

(10) Patent No.: US 6,320,973 B2
(45) Date of Patent: Nov. 20, 2001

(54) ANIMAL IDENTIFICATION SYSTEM BASED ON IRIAL GRANULE ANALYSIS

(75) Inventors: Masahiko Suzaki; Yuji Kuno, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/794,276

(22) Filed: Feb. 28, 2001

Related U.S. Application Data

(62) Division of application No. 09/048,180, filed on Mar. 26, 1998, now Pat. No. 6,229,905.

(30) Foreign Application Priority Data

Mar. 26, 1997 (JP) .................................................. 9-073190
Oct. 8, 1997 (JP) .................................................. 9-291687
Nov. 28, 1997 (JP) .................................................. 9-343841

(51) Int. Cl.[7] .................................................. G06K 9/00
(52) U.S. Cl. .................................................. 382/110; 382/117
(58) Field of Search .................................................. 382/100, 110, 382/117, 115; 351/205, 206, 211

(56) References Cited

U.S. PATENT DOCUMENTS

| 4,641,349 | 2/1987 | Flom et al. ........................... 382/117 |
| 5,291,560 | 3/1994 | Daugman .............................. 382/117 |
| 6,081,607 | 6/2000 | Mori et al. ........................... 382/117 |
| 6,144,754 | * 11/2000 | Okano et al. ........................ 382/117 |
| 6,215,891 | * 4/2001 | Suzaki et al. ........................ 382/117 |
| 6,229,905 | * 5/2001 | Suzaki .................................. 382/117 |

OTHER PUBLICATIONS

"High Confidence Visual Recognition of Persons by a Test of Statistical Indepenentce," Daugman, IEEE Transactions on Pattern, Analysis and Machine Intelligence, vol. 15, No. 11, Nov. 1993, pp. 1148–1161.

"Knowledge of Horse," Haruo Kimata, Simul Press, Sep. 1994, pp. 153–164.

* cited by examiner

*Primary Examiner*—Bhavesh Mehta
(74) *Attorney, Agent, or Firm*—Venable; Robert J. Frank; Allen Wood

(57) ABSTRACT

An animal identification system is provided which is designed to determine outlines of a pupil and irial granule in an input image of an eye of an animal to be identified, apply an arc to a lower portion of the outline of the pupil, turns back the arc from a principal axis to define a reference axis, and maps an image of the irial granule into a polar coordinate system whose origin is the center of the reference axis. The shape of the irial granule corrected in the above manner is compared with a reference shape stored in a memory to determine whether the input image arises from the same animal or not.

5 Claims, 28 Drawing Sheets

(CONTRACTED PUPIL)

(PARTIALLY CONTRACTED PUPIL)

(DILATED PUPIL)

(INPUTTED IMAGE)

(RECTANGULAR PUPILLARY IMAGE $I_p$)

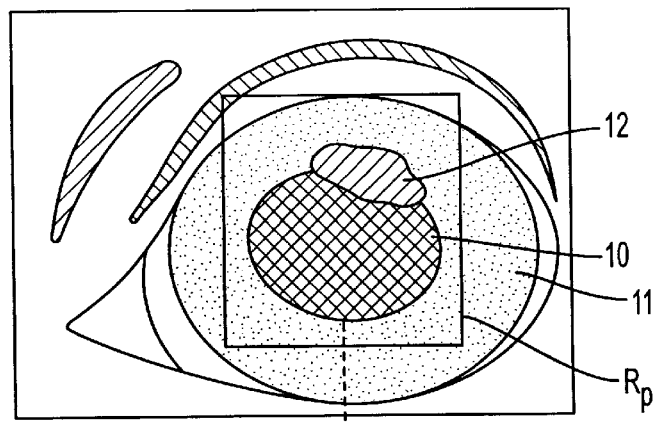
FIG. 13(a)
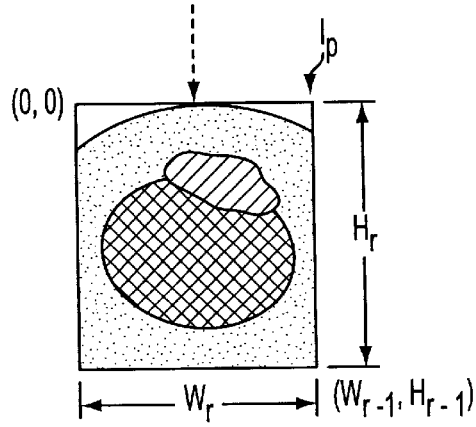
FIG. 13(b)
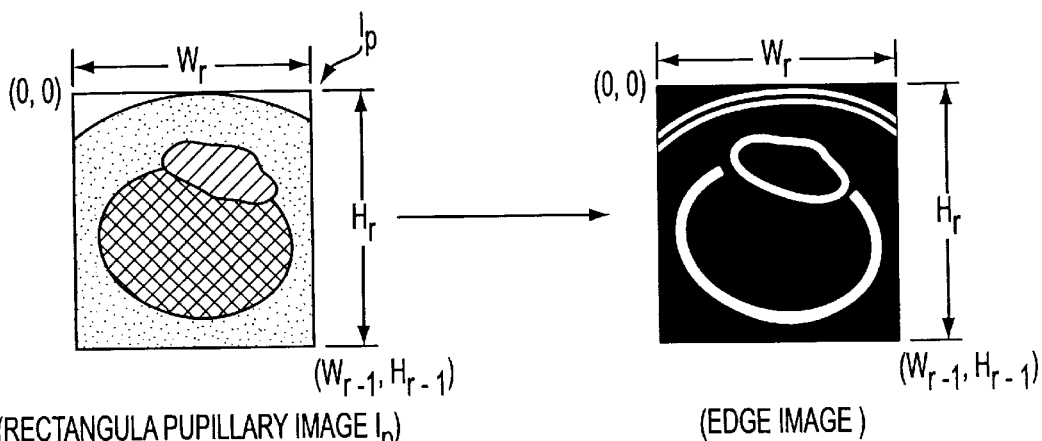
(RECTANGULA PUPILLARY IMAGE $I_p$)
FIG. 15(a)
(EDGE IMAGE)
FIG. 15(b)

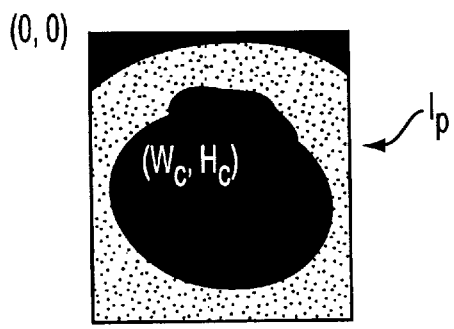
FIG. 18(a)
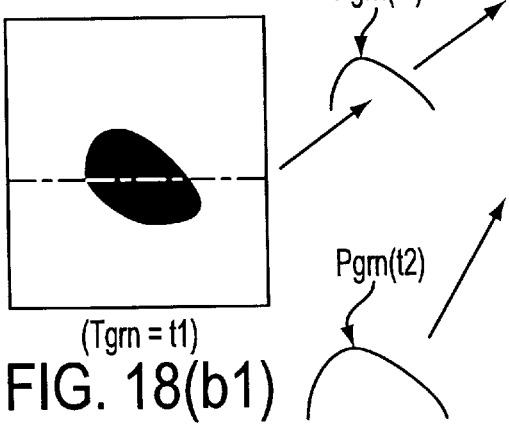
(Tgrn = t1)
FIG. 18(b1)
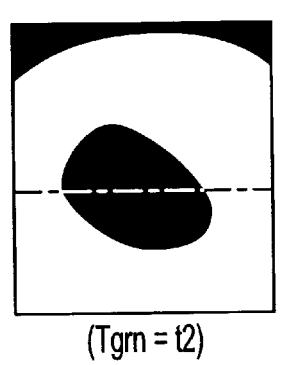
(Tgrn = t2)
FIG. 18(b2)
(EDGE IMAGE)
FIG. 18(c)
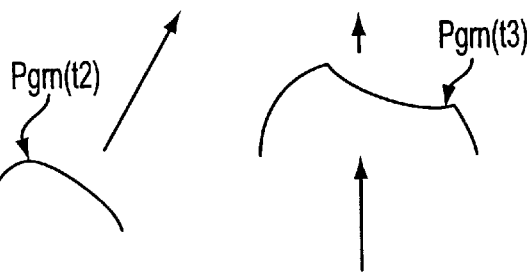
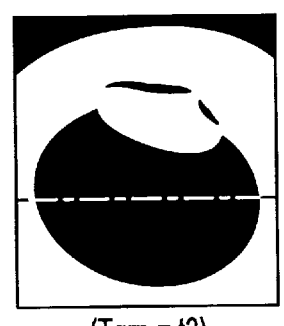
(Tgrn = t3)
FIG. 18(b3)

RECTANGULAR PUPILLARY IMAGE

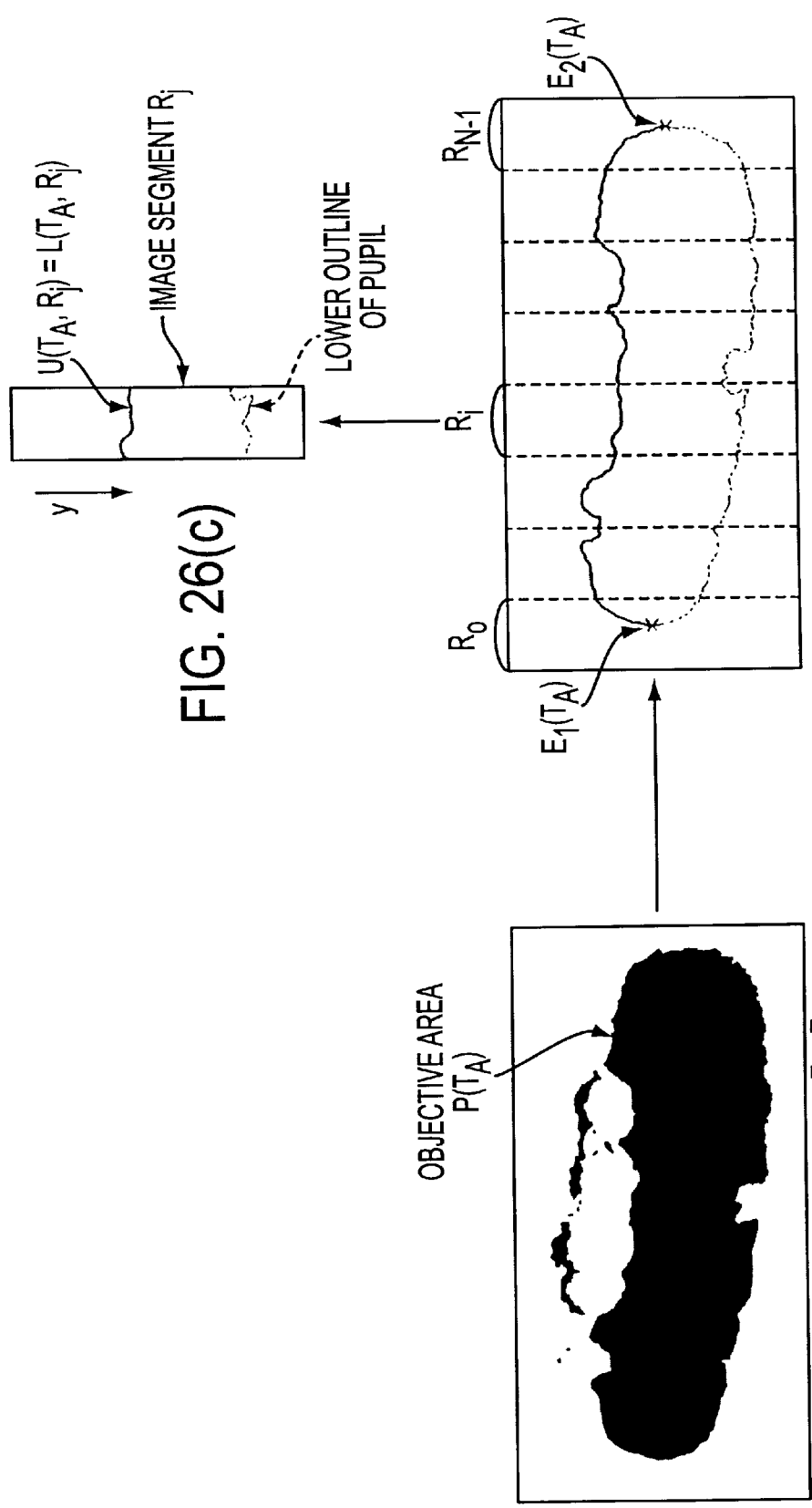

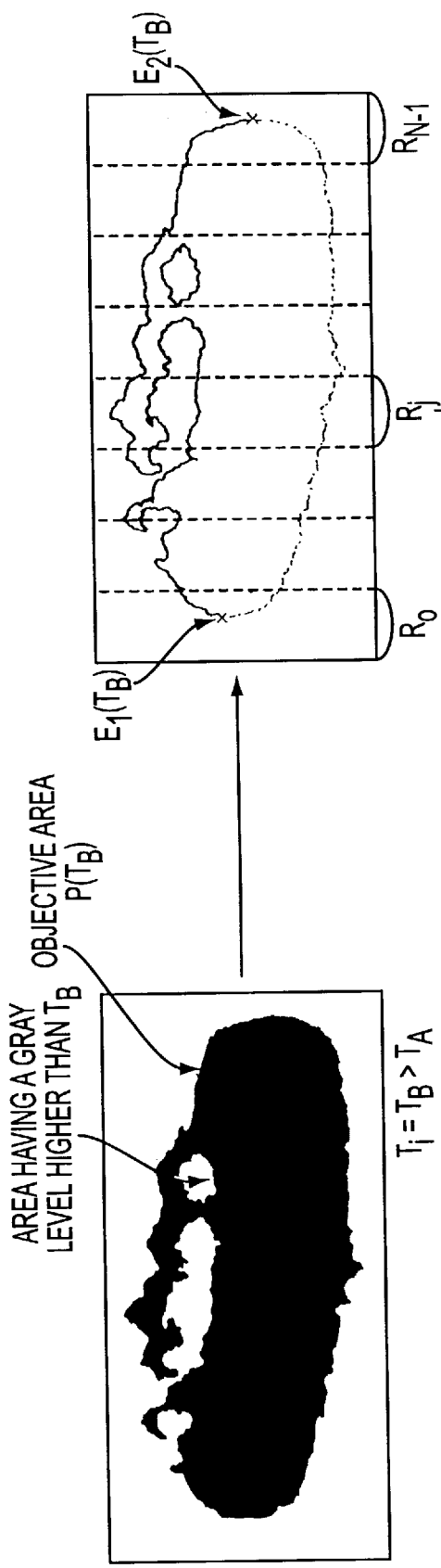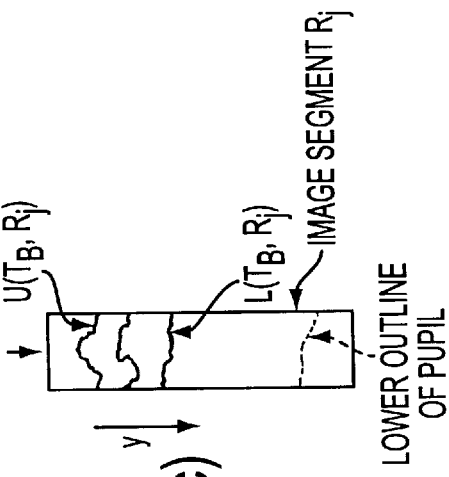

TABLE I

| | |
|---|---|
| (a) | $U.pos(T_i, R_j) = \dfrac{\sum_{k=0}^{M-1} Yu_{ijk}}{M}$ $L.pos(T_i, R_j) = \dfrac{\sum_{k=0}^{M-1} Yl_{ijk}}{M}$ |
| (b) | $POW(x,y) = D_{IP}(x,y-1) - D_{IP}(x,y)$ $(0 \le x < W_r, 1 \le y < H_r)$ |
| (c) | $POW(x,y) = \begin{cases} D_{IP}(x,y-1) - D_{IP}(x,y) & \text{if } D_{IP}(x,y-1) > D_{IP}(x,y) \\ 0 & \text{else} \end{cases}$ $(0 \le x < W_r, 1 \le y < H_r)$ |
| (d) | $U.pow(T_i, R_j) = \dfrac{\sum_{k=0}^{M-1} POW(Xl_{ijk}, Yl_{ijk})}{M}$ |

FIG. 28

TABLE II

| (a) | $UD1(T_i, R_j) = \begin{cases} U.\,pow(T_i, R_j) \times (E.\,pos - U.\,pos) & \text{if } E.\,pos - U.\,pos < POS_{max}, \\ U.\,pow(T_i, R_j) \times POS_{max} & \text{if } E.\,pos - U.\,pos \geq POS_{max}, \end{cases}$ <br><br> $LD1(T_i, R_j) = \begin{cases} L.\,pow(T_i, R_j) \times (E.\,pos - L.\,pos) & \text{if } E.\,pos - L.\,pos < POS_{max}, \\ L.\,pow(T_i, R_j) \times POS_{max} & \text{if } E.\,pos - L.\,pos \geq POS_{max}, \end{cases}$ |
|---|---|
| (b) | (1) if $UD1(T_c, R_j) \geq LD1(T_d, R_j)$, <br> $\quad$ C1. crd$(R_j)$ = U. crd$(T_c, R_j)$ (SUBSTITUTE ALL ELEMENTS) <br> $\quad$ C1. diff$(R_j)$ = UD1$(T_c, R_j)$ <br><br> (2) if $UD1(T_c, R_j) < LD1(T_d, R_j)$, <br> $\quad$ C1. crd$(R_j)$ = L. crd$(T_d, R_j)$ (SUBSTITUTE ALL ELEMENTS) <br> $\quad$ C1. diff$(R_j)$ = LD1$(T_d, R_j)$ |

FIG. 30

TABLE III

| | |
|---|---|
| (a) | $UD2(T_i, R_j) = \begin{cases} U.\,pow\,(T_i, R_j) \times (U.\,pos - E.\,pos) & \text{if } U.\,pos - E.\,pos < POS_{max}, \\ U.\,pow\,(T_i, R_j) \times POS_{max} & \text{if } U.\,pos - E.\,pos \geq POS_{max} \end{cases}$ <br><br> $LD2(T_i, R_j) = \begin{cases} L.\,pow\,(T_i, R_j) \times (E.\,pos - L.\,pos) & \text{if } E.\,pos - L.\,pos < POS_{max}, \\ L.\,pow\,(T_i, R_j) \times POS_{max} & \text{if } E.\,pos - L.\,pos \geq POS_{max} \end{cases}$ |
| (b) | (1) if $UD2(T_e, R_j) \geq LD2(T_f, R_j)$, <br> $\quad$ C2. crd $(R_j)$ = U. crd $(T_e, R_j)$ (SUBSTITUTE ALL ELEMENTS) <br> $\quad$ C2. diff $(R_j)$ = UD2 $(T_e, R_j)$ <br><br> (2) if $UD2(T_e, R_j) < LD2(T_f, R_j)$, <br> $\quad$ C2. crd $(R_j)$ = L. crd $(T_f, R_j)$ (SUBSTITUTE ALL ELEMENTS) <br> $\quad$ C2. diff $(R_j)$ = LD2 $(T_f, R_j)$ |

FIG. 31

TABLE IV

| | |
|---|---|
| (a) | UPPER. crd $(R_j)$ = C1. crd $(R_j)$   (SUBSTITUTE ALL ELEMENTS)<br>LOWER. crd $(R_j)$ = E. crd $(R_j)$   (SUBSTITUTE ALL ELEMENTS) |
| (b) | UPPER. crd $(R_j)$ = E. crd $(R_j)$   (SUBSTITUTE ALL ELEMENTS)<br>LOWER. crd $(R_j)$ = C2. crd $(R_j)$   (SUBSTITUTE ALL ELEMENTS) |
| (c) | $Tave = \dfrac{\sum_{j=0}^{N-1} E.\,thd\,(R_j)}{N}$ |

FIG. 32

ANIMAL IDENTIFICATION SYSTEM BASED ON IRIAL GRANULE ANALYSIS

CROSS-REFERENCE TO RELATED APPLICATION

This is a division of application Ser. No. 09/048,180, filed Mar. 26, 1998, now U.S. Pat. No. 6,229,910 the disclosure of which is incorporated herein by reference.

BACKGROUND OF THE INVENTION

1. Technical Field of the Invention

The present invention relates generally to an animal identification system designed to identify animals such as horse or cattle using biometric analysis, and more particularly to an automatic animal identification system based on analysis of irial granules which are unique for each individual.

2. Background Art

Typically, horse identification is achieved by visually perceiving physical features such as the color of hair or a pattern of white hair on the head or the body. Automatic identification systems have also been proposed which are designed to read identification data stored in a microchip embedded in the body of a horse.

For personal identification, automatic biometric systems are known which identify a particular human being based on image analysis of an iris of the human eye. Such techniques are taught in, for example, "High Confidence Visual Recognition of Persons by a Test of Statisical Independence", J. G. Daugman (1993), IEEE Trans and "Pattern Analysis and Machine Intelligence", 15(11), pp. 1148–1161.

Usually, animals such as horses or cattle have a three-dimensional protrusion called an irial granule, located around the pupil in the crystalline lens. The irial granule has a shape that is unique for each individual. Identification of animals such as horses or cattle can, thus, be performed based on analysis of the texture or shape of the irial granule.

The irial granule is, however, complex in shape and it is difficult to represent an outline of the irial granule using a geometric function having several parameters. Specifically, it is difficult for the conventional identification techniques as taught in the above references to extract the outline of the irial granule as image data.

The image of an eye captured by a videocamera in the open air may lack uniformity due to the use of an illuminator for the camera or entrance of external light, thus resulting in irregularity of image brightness of each of the pupil, the iris, and the irial granule or in dimness of the outline of the irial granule. A difficulty is, thus, encountered in extracting the outline of the irial granule through simple binary-coding or edge detection of the image.

SUMMARY OF THE INVENTION

It is therefore a principal object of the present invention to avoid the disadvantages of the prior art.

It is another object of the present invention to provide an animal identification system which is designed to extract from an image of an eye the shape of an irial granule required to identify a particular animal.

According to the first aspect of the present invention, there is provided an animal identification apparatus which comprises: (a) an outline extracting circuit that extracts from an image of an eye of an animal to be identified including a pupil and an irial granule an outline of the pupil; (b) an arc application processing circuit that determines an arc approximate to a specified portion of the extracted outline; (c) an irial granule deforming circuit that deforms the irial granule in the image according to the degree of deformation of the arc up to a reference level; and (d) a storage that registers data on the deformed irial granule of the animal to be registered.

In the preferred mode of the invention, the arc application processing circuit determines the arc in an x-y coordinate system to provide arc data indicating a length, a radius, and an angle of the arc. The irial granule deforming circuit maps the irial granule into polar coordinates wherein a straight line is defined as the reference level based on the arc data.

An irial granule identification circuit is further provided that compares data on the deformed irial granule of the animal to be identified with the data registered in the storage to determine whether the animal is registered or not based on a correlation between the compared data.

According to the second aspect of the present invention, there is provided an animal identification method comprising the steps of: (a) extracting from an image of an eye of an animal to be identified including a pupil and an irial granule an outline of the pupil; (b) applying an approximate arc to a specified portion of the extracted outline; (c) deforming the irial granule in the image according to the degree of deformation of the arc up to a reference level; and (d) registering data on the deformed irial granule of the animal in a storage.

In the preferred mode of the invention, arc data indicating a length, a radius, and an angle of the arc is determined to map the irial granule into polar coordinates wherein a straight line is defined as the reference level based on the arc data.

According to the third aspect of the invention, there is provided an animal eye image processing apparatus designed to process an image of an eye of an animal including a pupil and irial granule comprising: (a) a pupilary rectangle extracting circuit that determines an area in the image showing the smallest gray level of pixels representing the image as an area of the pupil and extracts a rectangular area including the pupilary area; and (b) a pupilary vertical center determining means for projecting a gray level of each pixel in the rectangular area in a horizontal direction to determine an area in the pupilary area showing the smallest frequency as a central position of the pupilary area in a vertical direction.

In the preferred mode of the invention, a pupilary horizontal center determining means is further provided for determining a center between both ends the pupilary area in the horizontal direction as a central position of the pupilary area in the horizontal direction.

According to the fourth aspect of the invention, there is provided an animal eye image processing apparatus designed to process an image of an eye including a pupilary area and an irial granule area in an iris area comprising: (a) a first outline extracting means for determining gray level differences between pixels forming the pupilary area and the irial granule area to extract outlines of both the areas; and (b) a second outline extracting means for determining gray level differences between pixels forming the iris area and the irial granule area to extract outlines of both the areas.

In the preferred mode of the invention, the first outline extracting means includes a pupilary center setting portion that sets a central position of the pupilary area and an outline searching portion that binary-codes an input image with a set threshold value, determines an area whose gray level is lower than the threshold value as an area including at least the central position of the pupilary area, and changes the threshold value to search the outlines of the pupilary area and irial granule area.

An edge image producing means is further provided for detecting an edge of the input image to produce an edge image. The outline searching portion determines whether pixels forming the outlines derived from the binary-coded image binary-coded using the threshold value agree with edge pixels of the edge image.

The pupilary center setting portion projects gray levels of a rectangular area surrounding the pupilary area in a horizontal direction to determine a central position of the pupilary area in a vertical direction using the fact that a pupil has the lowest gray level and defines a central position of the pupilary area in a horizontal direction at a central position of the rectangular area in the horizontal direction.

The second outline extracting means includes a search start point setting portion that sets a search start point position estimated to be within the irial granule area and an outline searching portion that binary-codes an input image with a set threshold value, determines an area whose gray level is lower than the threshold value as an area including at least the search start point, and changes the threshold value to search the outlines of the iris area and irial granule area.

The outline searching portion determines whether pixels forming the outlines derived from the image binary-coded using the threshold value agree with edge pixels of the edge image.

The search start point setting portion sets the search start point by searching a shadow produced in the irial granule area.

According to the fifth aspect of the invention, there is provided an animal eye image processing method wherein using an image picked up from an eye of an animal having an irial granule, a central position of a pupil is determined, comprising the steps of: (a) setting a rectangular area surrounding an pupilary area using the fact that the pupil has the lowest gray level; and (b) projecting gray levels of the rectangular area in a horizontal direction to determine a central position of the pupil in a vertical direction.

In the preferred mode of the invention, a central position of the pupil in the horizontal direction is determined at a central position of the rectangular area in the horizontal direction.

According to the sixth aspect of the invention, there is provided an animal eye image processing method wherein from an image picked up from an eye of an animal having an irial granule, an area of the irial granule is extracted, comprising: (a) a first outline extraction step of extracting a first outline of the irial granule on a boundary side of a pupil and the irial granule based on an average gray level difference between the pupil and the irial granule; and (b) a second outline extraction step of extracting a second outline of the irial granule on a boundary side of an iris and the irial granule based on an average gray level difference between the iris and the irial granule. The information on the first and second outlines is provided as area information on the irial granule.

In the preferred mode of the invention, the first outline extraction step includes a pupilary center setting step of setting a central position of the pupil and a first outline searching step of binary-coding an input image with a first threshold value and searching the outline on the boundary side of the pupil and the irial granule within area including a central position of the pupil in an area whose gray level is lower than the first threshold value or an area closest to the central position of the pupil by changing the first threshold value.

An edge image producing step is further provided which performs edge detection of the input image to produce an edge image. The first outline searching step evaluates whether a pixel of the edge image located at the same position as that of the first outline derived from the image binary-coded by the first threshold value constitutes an edge or not and terminates the search when what shows the highest evaluation level is found.

The pupilary center setting step projects gray levels of a rectangular area surrounding the pupilary area in a horizontal direction to determine a central position of the pupil in a vertical direction using the fact that the pupil has the lowest gray level and defines a central position of the pupil in a horizontal direction at a central position of the rectangular area in the horizontal direction.

The second outline extraction step includes a search start point setting step of setting a search start point position estimated to be within the irial granule area and a second outline searching step of binary-coding an input image with a second threshold value and searching the outline on the boundary side of the iris and the irial granule within an area including the search start point within an area whose gray level is lower than the second threshold value or an area closest to the search start point by changing the second threshold value.

The second outline searching step evaluates whether a pixel of the edge image located at the same position as that of the second outline derived from the image binary-coded by the second threshold value constitutes an edge or not and terminates the search when what shows the highest evaluation level is found.

The search start point setting step sets the search start point by searching a shadow produced in the irial granule area.

The search start point setting step sets the search start point within a lower gray level area located toward the iris from the first outline in the image binary-coded by the first threshold value.

According to the seventh aspect of the invention, there is provided an animal eye image processing apparatus comprising: (a) a pupilary rectangle extracting circuit that extracts from a captured image of an eye of an animal having an irial granule a rectangular area surrounding the irial granule; and (b) an irial granule area extracting circuit that divides the rectangular area determined by the pupilary rectangle extracting circuit in a lateral direction into image segments and determines an outline of the irial granule in each of the image segments.

In the preferred mode of the invention, the irial granule area extracting circuit defines as an objective area an area in an image binary-coded using a threshold value whose gray level is lower than the threshold value, determines an outline of the objective area in each of a plurality of different threshold values, and after the outlines are determined in all the threshold values, determines which of the outlines is a real outline of the irial granule.

The irial granule area extracting circuit stores an outline of an area within the objective area which is brighter than a threshold value in addition to the outlines of the objective area and determines which of the threshold values provides one of the outlines binary-coded that is the real outline of the irial granule.

The irial granule area extracting circuit may store average edge intensities on the outline of the objective area in each of the image segments and determines the outline having the greatest average edge intensity in each of the image segments as an upper or lower outline of the irial granule.

If the upper or lower outline is one of the outlines, the irial granule area extracting circuit determines the lower or upper outlines as the other outline, determines the outline that is located at a given distance away from the one of the outlines and that has the greater average edge intensity as the other outline, and determines an area surrounded by both the outlines as an area of the irial granule.

The irial granule area extracting circuit may store a threshold value when the outline has the greatest edge intensity in each of the image segments, determines an average threshold value of the threshold values in all the image segments, and determines both ends of an objective area binary-coded by the average threshold value as both ends of the irial granule.

According to the eighth aspect of the invention, there is provided an animal eye image processing method comprising the steps of: (a) extracting from an image derived by capturing an eye of an animal having an irial granule a rectangular area surrounding the irial granule; and (b) dividing the rectangular area in a lateral direction into image segments and determining an outline of the irial granule in each of the image segments.

In the preferred mode of the invention, an area in an image binary-coded using a threshold value whose gray level is lower than the threshold value is defined as an objective area, an outline of the objective area in each of a plurality of different threshold values is determined, and after the outlines are determined in all the threshold values, it is determined which of the outlines is a real outline of the irial granule.

An outline of an area within the objective area which is brighter than a threshold value is stored in addition to the outlines of the objective area, and it is determined which of the threshold values provides one of the outlines binary-coded that is the real outline of the irial granule.

Average edge intensities on the outline of the objective area are in each of the image segments, and the outline having the greatest average edge intensity in each of the image segments is determined as an upper or lower outline of the irial granule.

If the upper or lower outline is one of the outlines, the lower or upper outlines is determined as the other outline. The outline that is located at a given distance away from the one of the outlines and that has the greater average edge intensity is determined as the other outline. An area surrounded by both the outlines is determined as an area of the irial granule.

A threshold value when the outline has the greatest edge intensity is stored in each of the image segments. An average threshold value of the threshold values in all the image segments is determined. Both ends of an objective area binary-coded by the average threshold value are determined as both ends of the irial granule.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiment but are for explanation and understanding only.

In the drawings:

FIG. 13(a) is an illustration which shows an image of an eye;

FIG. 13(b) is an illustration which shows a rectangular pupilary image extracted from the image in FIG. 13(a);

FIG. 15(a) is an illustration which shows a rectangular pupilary image;

FIG. 15(b) is an illustration which shows an edge image produced from the image of FIG. 15(a);

FIG. 18(a) is an illustration which shows a rectangular pupilary image;

FIGS. 18(b1) to 18(b3) are illustrations which show images of a pupil produced with different brightness threshold values;

FIG. 18(c) is an illustration which shows an edge image of FIG. 18(a);

FIG. 26(a) shows an image derived by binary-coding the rectangular pupilary image of FIG. 25;

FIG. 26(b) shows image segments into which the image of FIG. 26(a) is divided;

FIG. 26(c) shows one of the image segments in FIG. 26(b);

FIG. 27(a) shows an image derived by binary-coding the rectangular pupilary image using a threshold value TB;

FIG. 27(b) shows image segments into which the image of FIG. 26(a) is divided;

FIG. 27(c) shows one of the image segments in FIG. 27(b);

FIG. 28 shows a table I listing equations used to determine the intensity of an outline;

FIG. 30 shows a table II listing equations used to determine a counter outline of a reference outline assuming that the reference outline is a lower outline of an irial granule;

FIG. 31 shows a table III listing equations used to determine a counter outline of a reference outline assuming that the reference outline is an upper outline of an irial granule; and FIG. 32 shows a table IIII listing equations used to determine whether a counter outline is an upper or a lower outline of an irial granule.

DESCRIPTION OF THE PREFERRED EMBODIMENTS

Prior to describing an animal identification system according to the invention, a typical structure of the eyes of horses will be discussed with reference to FIG. 2.

Figure 2:
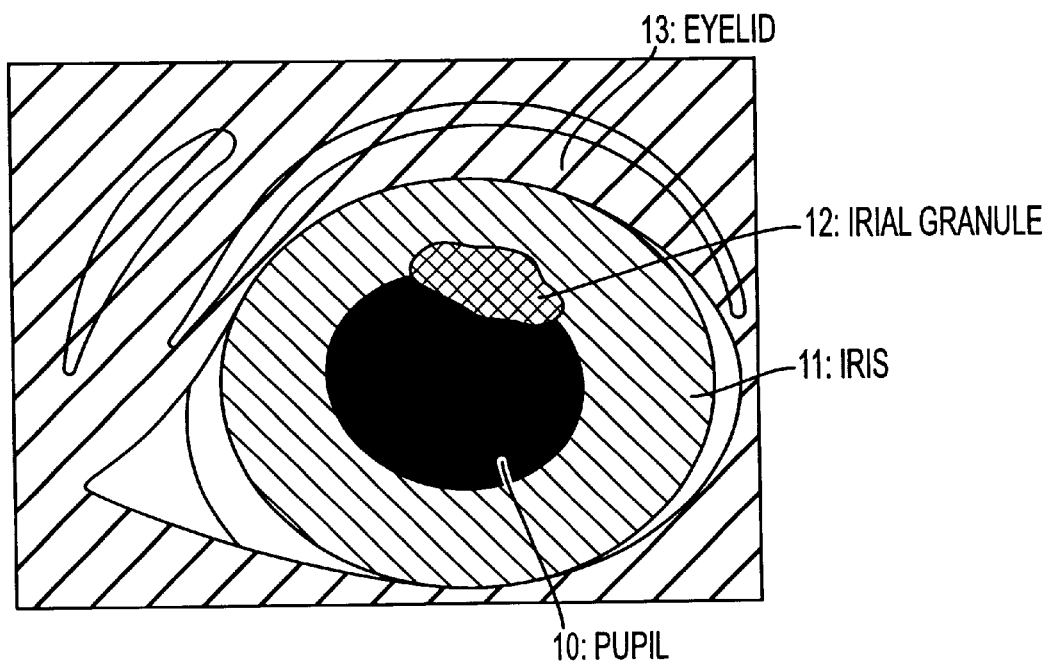
FIG. 2 is an illustration which shows an image of an eye of a horse.

FIG. 2 shows an eyeball of the horse which includes a pupil 10 between upper and lower eyelids 13, an iris 11, and an irial granule 12. A major difference between the horse's eyes and human eyes is that the pupil 10 is of an oval shape, and the irial granule 12 exists between the pupil 10 and the iris 11, which is unique for horses and ruminants.

The external light passes through the pupil 10 and reaches the retina located behind the pupil 10. The iris 11 is formed with muscle surrounding the pupil 10 and dilates and contracts to control the quantity of light entering the pupil 10. The irial granule 12 is formed with a string of semi-circle grains. The irial granule 12 contains melanin pigment abundantly and is black so that it serves to absorb light for preventing excessive light from entering the pupil 10.

The irial granule 12 has formed on a surface thereof fine wrinkles and protrusions and has a three-dimensional shape and size that are unique for each individual and that are also different between the right and left eyes. The animal identification system of the present invention is, as described later in detail, designed to capture images of eyes of specified horses through a camera to extract irial granule images and store them as reference irial granule codes. When a particular horse is identified, an image of an irial granule of that horse is captured and compared with the irial granule reference codes to determine whether it originates from the same horse or not.

Usually, the shape of the irial granule 12 changes on contraction and dilation of the pupil 10.

Figure 3A:
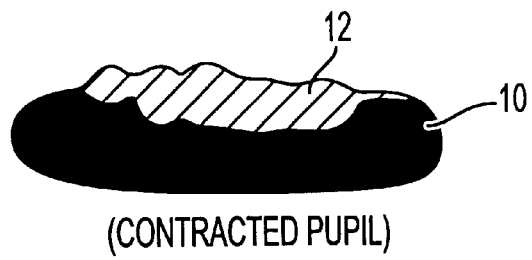
FIG. 3(a) is an illustration which shows a pupil and an irial granule when the pupil contracts.
Figure 3B:
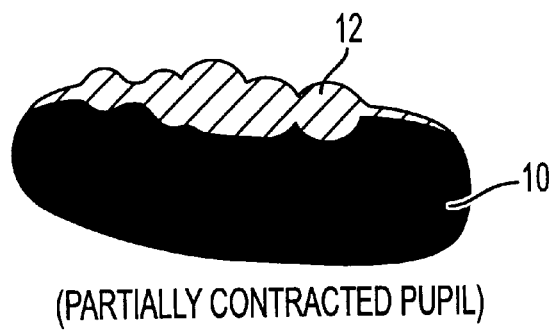
FIG. 3(b) is an illustration which shows a pupil and an irial granule when the pupil contracts partially.
Figure 3C:
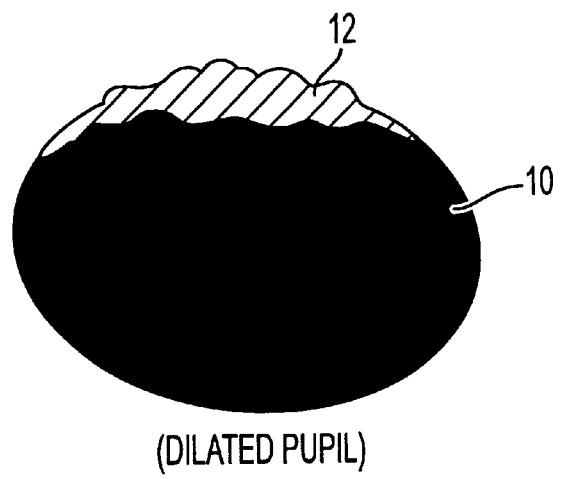
FIG. 3(c) is an illustration which shows a pupil and an irial granule when the pupil dilates.

FIGS. 3(a) to 3(c) show such a change in shape of the irial granule 12. FIG. 3(a) illustrates the pupil 10 which contracts. FIG. 3(b) illustrates the pupil 10 which contracts partially. FIG. 3(c) illustrates the pupil 10 which dilates.

As can be seen from the drawings, when the pupil 10 dilates, the whole of the irial granule 12 is, unlike the contraction of the pupil 10, curved along the profile of the pupil 10. The identification system of the invention, thus, corrects image data of the irial granule 12 so as to show a uniform shape for the irial granule 12 regardless of conditions of the pupil 10.

The image correction of the shape of a irial granule 12 requires the determination of the degree to which the pupil 10 dilates. This determination may be achieved by approximating the image of the pupil 10 to a specified geometric figure in a suitable coordinate system.

Figure 1:
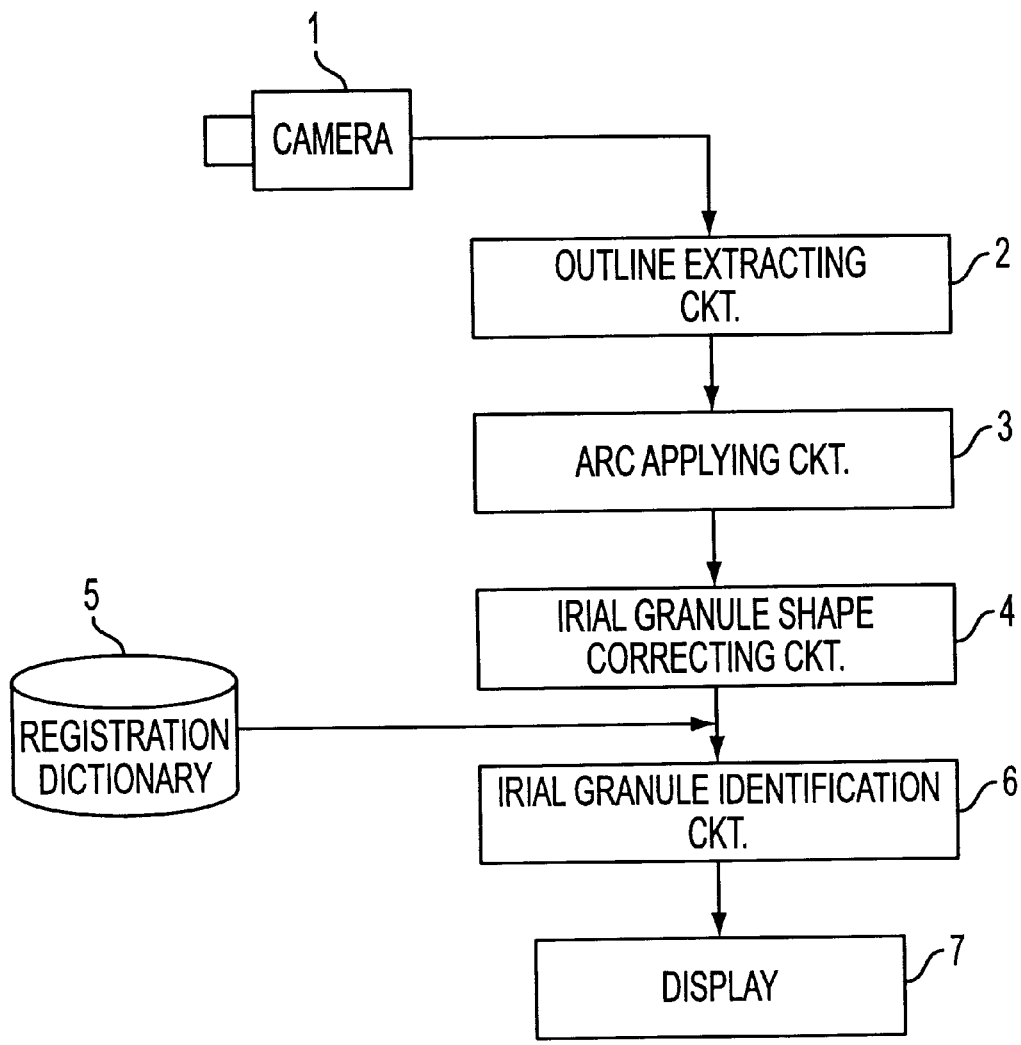
FIG. 1 is a block diagram which shows an animal identification system according to the first embodiment of the invention.

Referring back to FIG. 1, there is shown the animal identification system according to the first embodiment of the invention.

The animal identification system includes generally a camera 1, an outline extracting circuit 2, an arc applying circuit 3, an irial granule shape correcting circuit 4, a reference code storage 5, an irial granule identification circuit 6, and a display 7.

The camera 1 includes, for example, a CCD image sensor which acquires an eye of an image of an animal such as a horse or cow to be identified to provide a bit-mapped image to the outline extracting circuit 2.

The outline extracting circuit 2 extracts from the input image the outline of the irial granule 12 and the outline of a portion of the pupil 10 not covered by the irial granule 12. In the case of horse's eyes, the irial granule 12 exists, as shown in FIG. 2, on the pupil 10. It is, thus, impossible to visually perceive the outline of a portion of the pupil 10 covered by the irial granule 12. The outline extracting circuit 2, thus, projects the outline of the pupil 10 graphically.

The arc applying circuit 3 approximates an arc to the outline of the pupil 10 derived by the outline extracting circuit 2 to define a pupilary coordinate system for correcting the irial granule 12.

The irial granule shape correcting circuit 4 transforms the outline of the pupil 10 to the pupilary coordinate system produced by the arc applying circuit 3 to map the image of the irial granule 12 through a given function.

The registration dictionary 5 stores therein reference irial granule data for comparison with an input image of the irial granule of a particular horse to be identified.

The irial granule identifying circuit 6 displays the input image of the irial granule and one of the reference irial granule images read out of the registration dictionary 5 for visual comparison or alternatively determines whether the irial granule data of the input image is identical to the reference irial granule data or not using a known pattern matching technique.

The outline extracting circuit 2, the arc applying circuit 3, the irial granule shape correcting circuit 4, the reference data storage 5, and the irial granule identification circuit 6 are logically realized by programs performed by a computer. These programs may be stored in a storage medium such as a floppy disc or a CD-ROM and installed in the computer or alternatively be down-loaded through a network.

The operation of the animal identification system will be described below. Note that the following discussion will refer to identification of a horse, but the invention is not limited to the same and may be used to identify another animal having an irial granule.

Figure 4:
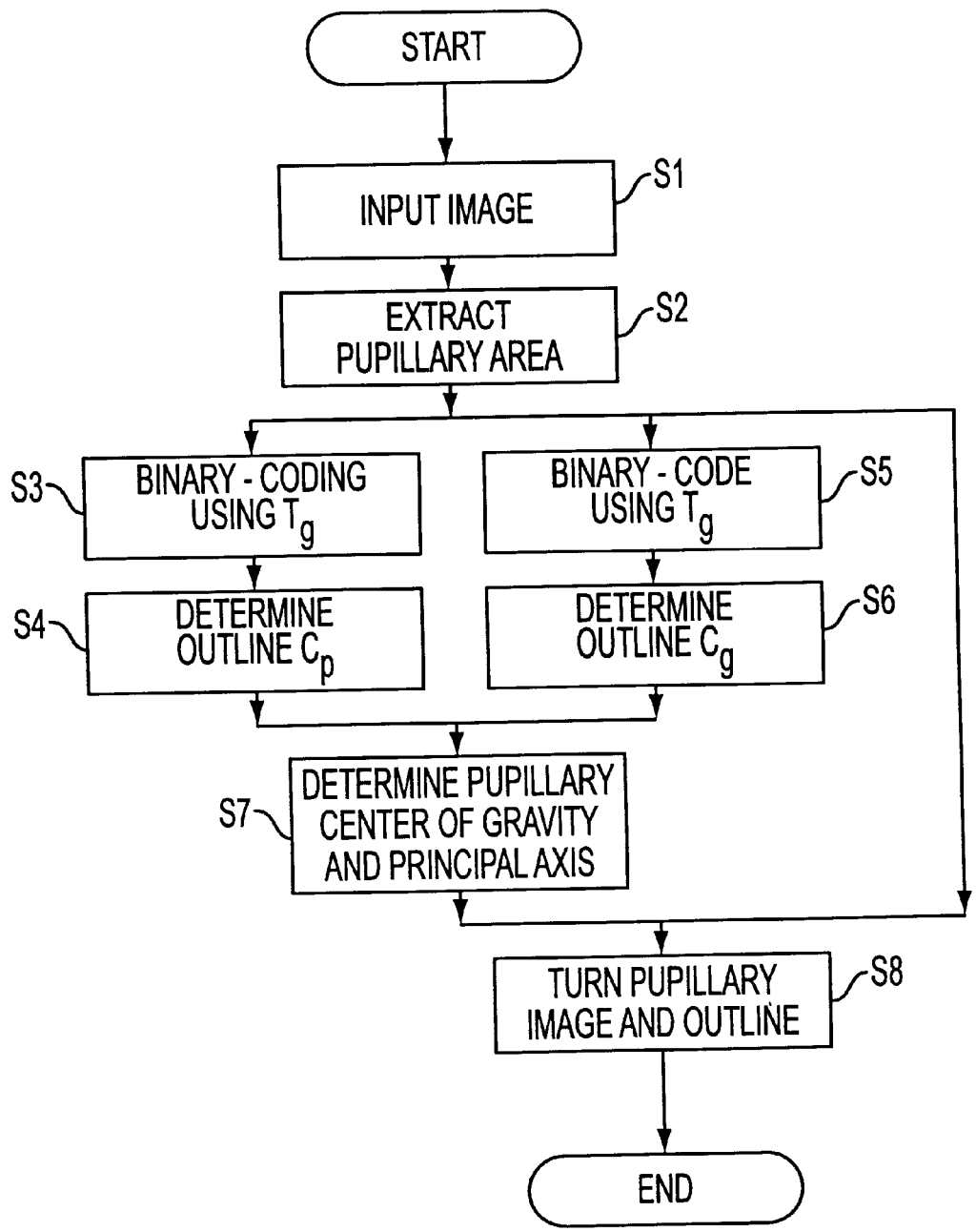
FIG. 4 is a flowchart of a program to extract an outline of an irial granule.

FIG. 4 shows a flowchart of a program or sequence of logical steps performed by the outline extracting circuit 2.

First, an eye of a particular horse to be identified is captured by the camera 1 in digital form and inputted to the outline extracting circuit 2 as an image (step 1). The outline extracting circuit 2 extracts a rectangular area including the pupil 10 and the irial granule 12 from the inputted image (step 2). This extraction may be achieved based on the fact that a pupilary area usually has the lowest brightness in an image of a horse's eye and is located near the center of the image. Indeed, the inputted image is binary-coded using a given brightness threshold value T. A portion of the binary-coded image closest to the center thereof among portions having brightness levels lower than the brightness threshold value T is detected.

Figure 5A:
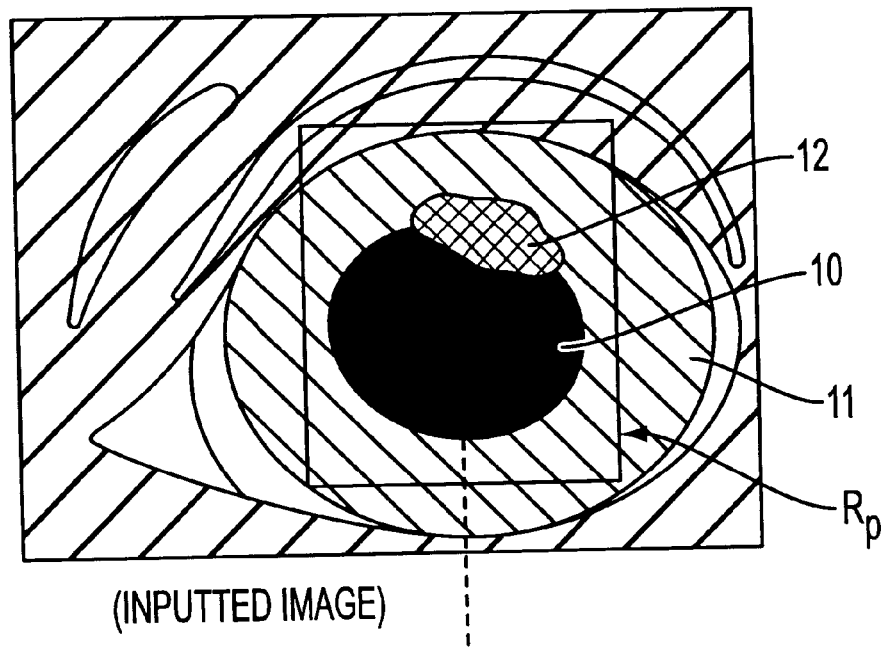
FIG. 5(a) is an illustration which shows an image of an eve.
Figure 5B:
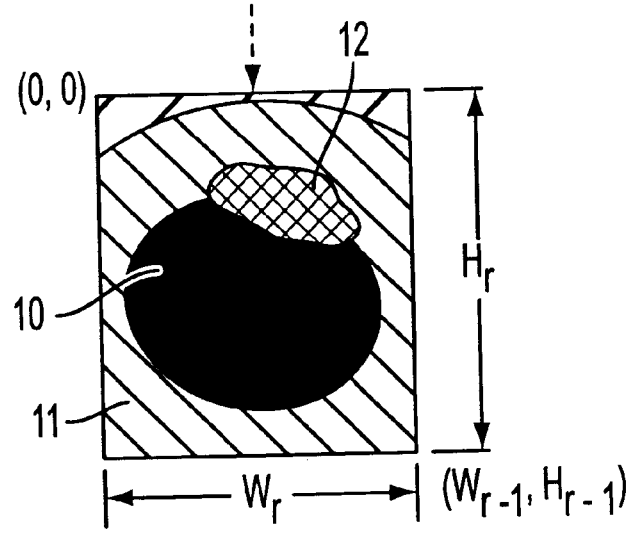
FIG. 5(b) is an illustration which shows a rectangular pupilary image extracted from the image in FIG. 5(a)

The portion of the binary-coded image detected by the outline extracting circuit 2 is shown as an rectangular area Rp in FIG. 5(a). The rectangular area Rp includes an image of the pupil 10 and a marginal image containing the irial granule 12 and has a width Wr and a height (i.e., the length) Hr, as shown in FIG. 5(b). The size of the margin may be constant or variable according to the size of the pupil 10.

The outline extracting circuit 2 extracts the rectangular area Rp from the input image to produce a rectangular pupilary image Ip and defines a coordinate system, as shown in FIG. 5(b), in which the upper left corner of the image Ip lies at the origin (0,0) and the lower right corner thereof lies at a point (Wr−1, Hr−1).

Within the rectangular pupilary image Ip, the pupil 10 has the lowest average gray level, the irial granule 12 has the second lowest average gray level, and the iris 11 has the third lowest average gray level. Therefore, brightness threshold values Tp and Tg are determined as $$Dp < Tp < Dg < Tg < Di$$
$$\text{dark} \qquad\qquad \text{light}$$

where Dp, Dg, and Di are the average gray levels of the pupil 10, the irial granule 12, and the iris 11, respectively.

The outline extracting circuit 2 searches, as shown in FIGS. 6(a) to 6(g), outlines of the pupil 10 and the irial granule 12.

FIGS. 6(a) to 6(g) illustrate a pupil 10 which is partially dilated.

Figure 6A:
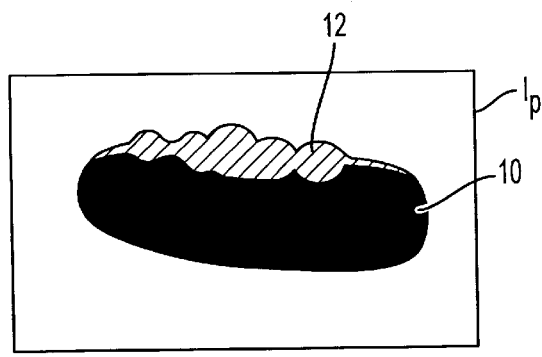
FIGS. 6(a) to 6(g) are illustrations which show a sequence of image-processing operations to extract outlines of a pupil and an irial granule.
Figure 6B:
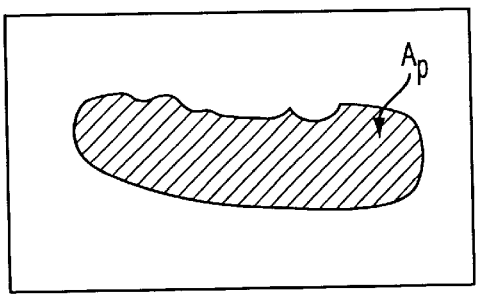
Figure 6C:
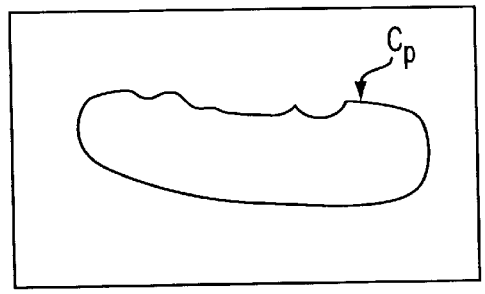

The rectangular pupilary image Ip, as shown in FIG. 6(a), is binary-coded using the brightness threshold value Tp to produce an area Ap, as shown in FIG. 6(b), which has a gray level lower than the brightness threshold value Tp (step 3). The area Ap indicates the pupil 10. An outline of the area Ap that is an outline of the pupil 10 minus an outline of a portion of the irial granule 12 overlapping with the pupil 10 (i.e., a boundary line between the pupil 10 and the irial granule 12) is determined as Cp, as shown in FIG. 6(c) (step 4).

Figure 6D:
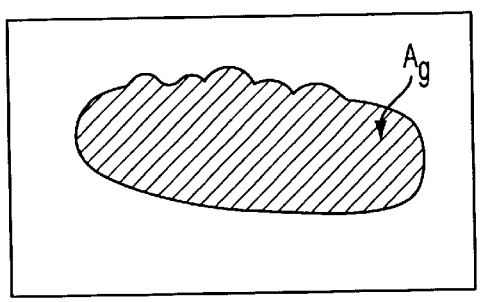
Figure 6E:
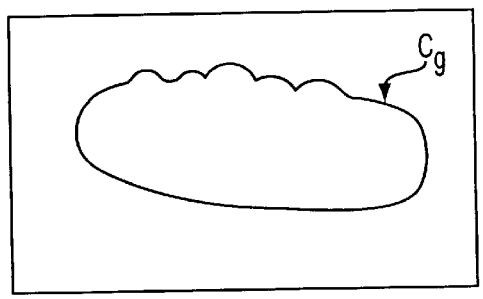
Figure 6F:
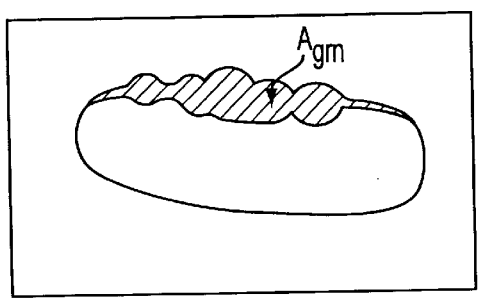

The rectangular pupilary image Ip, as shown in FIG. 6(d), is binary-coded using the brightness threshold value Tg to produce an area Ag, as shown in FIG. 6(d), which has a gray level lower than the brightness threshold value Tg (step 5). The area Ag includes the pupil 10 and the irial granule 12. An outline of the area Ag that is the outline of the pupil 10 plus a boundary line between the iris 11 and the irial granule 12 is determined as Cg, as shown in FIG. 6(e) (step 6). Therefore, an area Agrn, a shown in FIG. 6(f), enclosed by the outlines Cp and Cg indicates the irial granule 12.

Figure 6G:
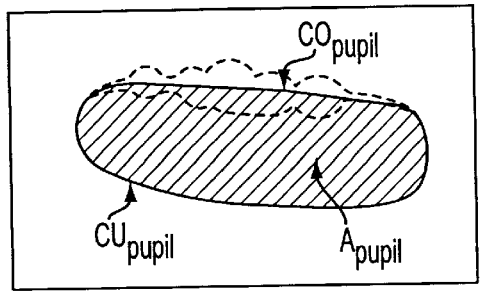

In the case of an eye of the horse, the irial granule 12 exists, as shown in FIG. 2, on an upper portion of the pupil 10, so that lower halves of the outlines Cp and Cg almost coincide with each other. The lower halves of the outlines Cp and Cg are, thus, defined as an outline CUpupil of a lower half of the pupil 10, as shown in FIG. 6(g). An outline of an upper half of the pupil 10 is defined as COpupil on the assumption that it extends along the center line between upper halves of the outlines Cp and Cg. An area enclosed by the outlines CUpupil and COpupil is defined as Apupil.

Using the method of principal components, for example, the center of gravity and the principal axis of the pupil 10 in the rectangular pupilary image Ip are determined (step 7). In the case where the rectangular pupilary image Ip is a bit-mapped image, the principal axis is defined by a line which extends so as to maximize the distribution of dots representing the pupil 10. For example, the average of distances between any line and all dots (i.e., pixels) within a pupilary area in the rectangular pupilary image Ip is determined. Next, a line that minimizes the average is defined as the principal axis.

Figure 7A:
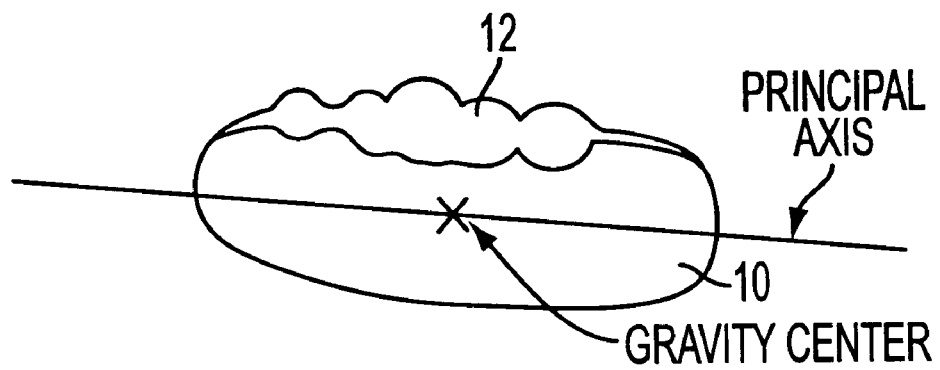
FIGS. 7(a) and 7(b) are illustrations which show definition of a coordinate system for an image of a pupil and an irial granule.

FIG. 7(a) shows the center of gravity of the principal axis of the pupil 10 determined in the above manner.

Figure 7B:
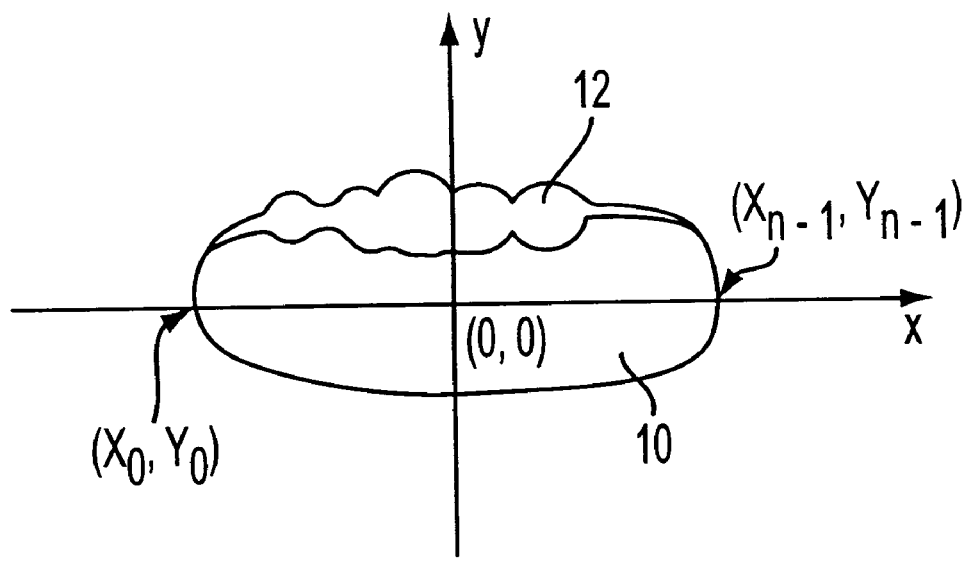

The rectangular pupilary image Ip or the outlines Cp and Cg are turned about the center of gravity of the pupil 10 to orient the principal axis horizontally, as shown in FIG. 7(b). An x-y coordinate system is defined whose x axis is the principal axis and wherein the center of gravity of the pupil 10 lies at the origin (0, 0) (step 8).

The operation of the arc applying circuit 3 will be described below.

The arc applying circuit 3 approximates an arc whose center lies on the y axis of the x-y coordinate system determined in step 8 in FIG. 4 to the lower half of the pupil 10 in the following manner.

First, a collection of dots representing the outline CUpupil of the lower half of the pupil 10 is, as shown in FIG. 7, defined, on the coordinate system, as $$CUpupil=\{(X0, Y0), (X1, Y1), \ldots, (Xn-1, Yn-1)\}$$

where n is the number of dots constituting the outline CUpupil and satisfies the relations of $0 \leq i < n$ and $Xi < Xi+1$.

When the pupil 10 partially contracted, as shown in FIGS. 6(a) to 6(g), it becomes impossible to approximate a single arc to a central portion and end portions of the outline of the lower half of the pupil 10. The arc is, thus, approximated to a portion of the pupil 10 excluding both end portions thereof. Each of the end portions of the pupil 10 to be excluded occupies 5 to 10% of the horizontal length Lp of the pupil 10 (i.e., an interval between both ends of the pupil 10). The number of portions of the pupil 10 to be excluded is m (the total number is 2 m). The approximation of the art to the lower half of the outline of the pupil 10 may be achieved in the following manner.

Figure 8:
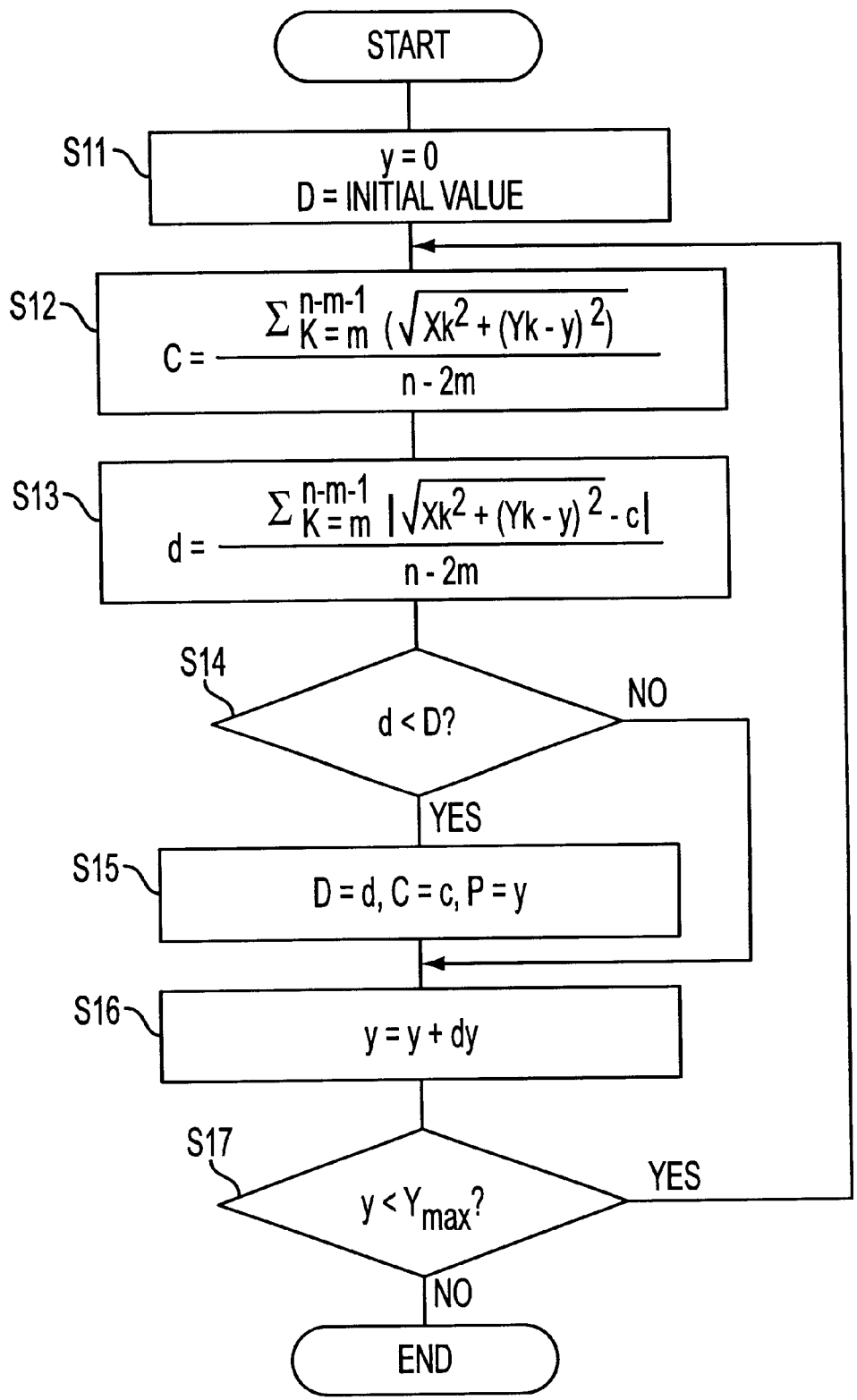
FIG. 8 is a flowchart of a program to approximate an arc to an outline of a pupil.

Referring back to FIG. 8, there is shown a flowchart of a program or sequence of logical steps performed by the arc applying circuit 3.

After entering the program, the y coordinate is set to zero (y=0), and D, which is an error to be determined finally, is set to a given relatively large initial value (step 11). A circle is defined whose center lies at a point (0, y), and an average radius C, that is, an interval between the center of the circle and the outline of the lower half of the pupil 10 is calculated according to the equation indicated in step 12 of the drawing. An error d is calculated according to the equation indicated in step 13 of the drawing. It is determined whether the error d is smaller than D or not (step 14).

If a YES answer is obtained in step 14 (d<D), then the initial value D, the average radius C, and the y coordinate P of the center of the arc are determined as the error d, the radius c, and the coordinate y in this program execution cycle (step 15).

The coordinate y is updated as y=y+dy (step 16). It is determined whether the value of y is smaller than a given maximum value Ymax or not (step 17). If a YES answer is obtained (y<Ymax), then the routine returns back to step 12. Note that dy and Ymax are positive constants, respectively.

In this manner, a given number of the arc radii c and the errors d are derived until the value of y reaches the maximum value Ymax. The coordinate y and the radius c in one of the program execution cycles in which the error d shows the smallest value are defined as P and C that are the y coordinate of the center and the radius of the arc to be approximated to the outline of the lower half of the pupil 10.

Figure 9:
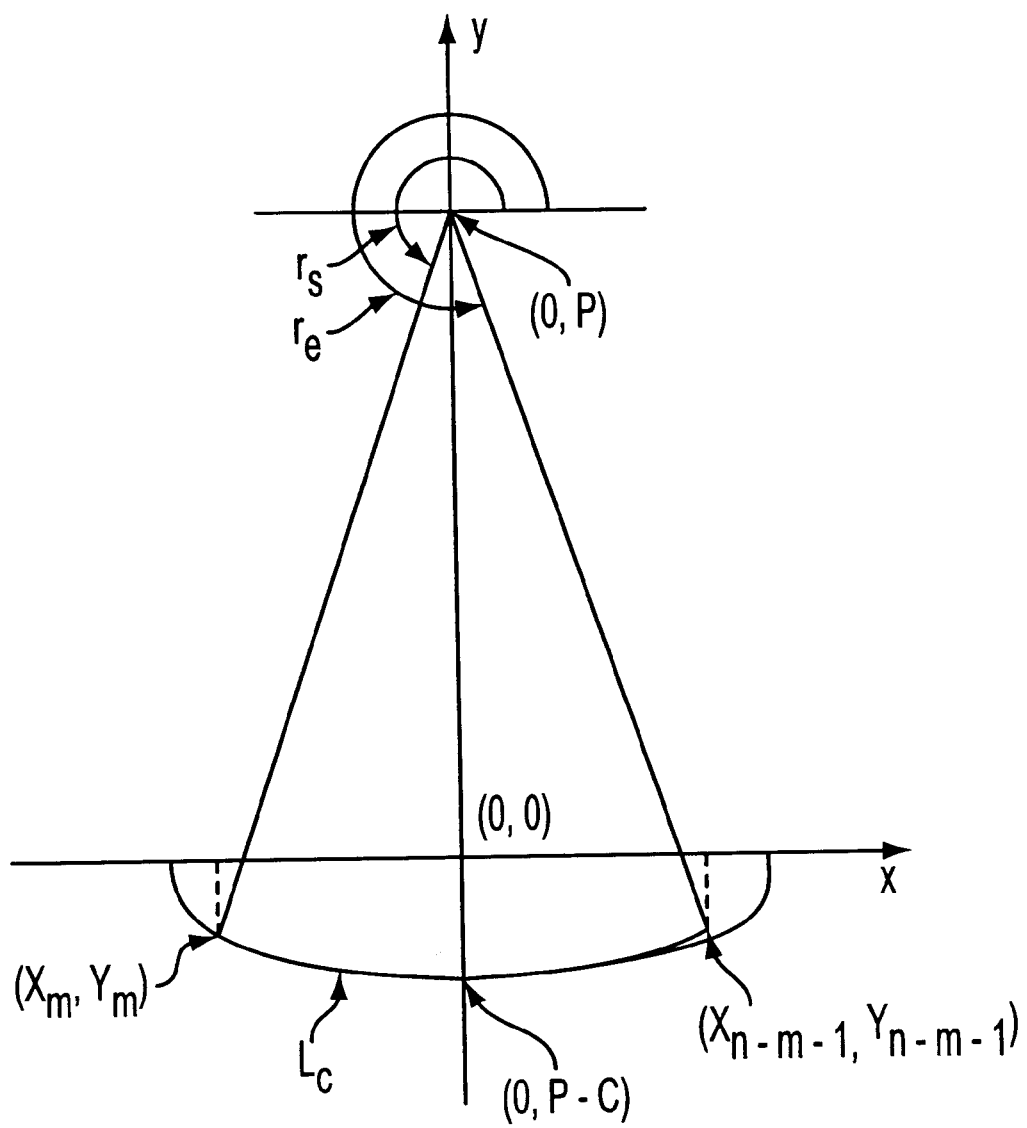
FIG. 9 is an illustration which shows approximation of an arc to an outline of a lower half of a pupil.

The equation of a circle including the arc, as shown in FIG. 9, to be approximated to the lower half of the pupil 10 is expressed as $$x^2+(y-P)^2=C^2$$

If, as shown in FIG. 9, angles which lines extending between the center of the circle and both ends of the arc make with a line extending through the center of the circle in parallel to the x axis are defined as rs and re (=3π−rs), and the length of the arc is defined as Lc, they satisfy the following relations.

$$Re=3\pi-rs=\arccos(Xm/C)$$

$$Lc=2\pi C\times\{(re-rs)/2\pi\}=C\times(re-rs)$$

The arc may alternatively be determined any other techniques such as the Hough transformation.

The operation of the irial granule shape correcting circuit 4 will be described blow.

Figure 10A:
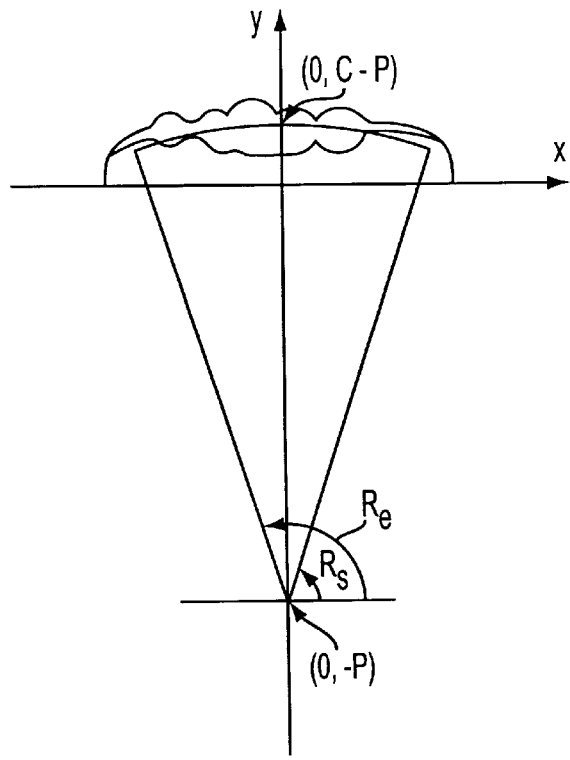
FIGS. 10(a) and 10(b) are illustration which show correction operations for extracting an outline of an irial granule.

The irial granule shape correcting circuit 4 defines a second arc, as shown in FIG. 10(a), that is a mirror image of the arc approximated to the outline of the lower half of the pupil 10 across the principal axis (i.e., the x axis in FIG. 9). A circle including the second arc is expressed as $$x^2+(y+P)^2=C^2$$

The angles Rs and Re meet the relation of Rs=π−Re=rs−π.

The correction of the shape of the irial granule 12 is performed while keeping the length of the second arc constant. Specifically, the image of the pupil 10 and the outline thereof are transformed to a polar coordinate system defined by the distance r from the center of the circle (i.e., the ordinate axis) and the angle θ to the x axis (i.e., the abscissa axis) in angular units Rt=(Re−Rs)/Lc.

Figure 10B:
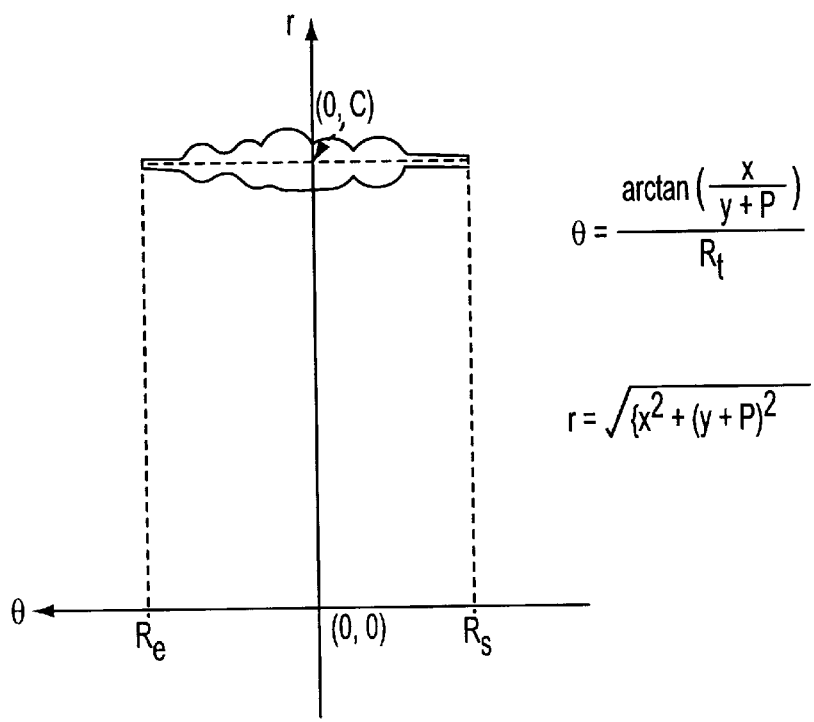

Therefore, coordinates (x, y) are, as shown in FIG. 10(b), transformed to coordinates (θ, r) that are $$\theta=\arctan(x/(y+P))\div Rt$$

$$r=\sqrt{e,rad}\ \{x^2+(y+P)^2\}$$

In the following discussion, the transformed image of the irial granule 12, a collection of dots representing the outline of the upper half of the irial granule 12, and a collection of dots representing the outline of the lower half of the irial granule 12 are expressed by Igrn, COgrn, and CUgrn, respectively.

The irial granule identification circuit 6 identifies input data on the irial granule 12 by comparing it with reference data, i.e., reference irial granule images corrected by the irial granule shape correcting circuit 4, stored in the registration dictionary 5. The identification of the irial granule 12 may be achieved by displaying the input data on the irial granule 12 and the reference data stored in the registration dictionary 5 and visually comparing them or alternatively by using known pattern matching techniques.

The identification of the irial granule 12 based on the pattern matching will be discussed below.

A one-dimensional waveform Fgrn is defined whose amplitude corresponds to the difference between the upper half outline COgrn and the lower half outline CUgrn of the irial granule 12 (i.e., the width of the irial granule 12 in a vertical direction, as viewed in the drawing). Similarly. a one-dimensional waveform FDgrn is defined in the same manner using the reference data stored in the registration dictionary 5.

The image of the irial granule 12 outputted from the irial granule shape correcting circuit 4 and an image of a reference irial granule read out of the registration dictionary 5 are so scaled that the sizes thereof agree with each other. This scaling is achieved by determining the value of correlation between the waveform Fgrn scaled in units of given ratio and the waveform FDgrn and adjusting the size of the image of the irial granule 12 in a scaling ratio when the value of correlation shows the greatest value. The value of correlation shows great value when two input images are similar.

The value of correlation between the input image of the irial granule 12 whose size is normalized and the reference irial granule stored in the registration dictionary 5 is determined. If this value is greater than a preselected value, then it is determined that the irial granule 12 of the input image and the reference irial granule arise from the same horse.

The result of identification in the iris identification circuit 6 is indicated on the display 7.

The irial granule identification circuit 6 of this embodiment, as described above, identifies the animal based on the shape of the outline of the irial granule 12, but the invention is not limited to the same. For example, the pattern recognition techniques using an image of the irial granule may be employed.

Figure 11:
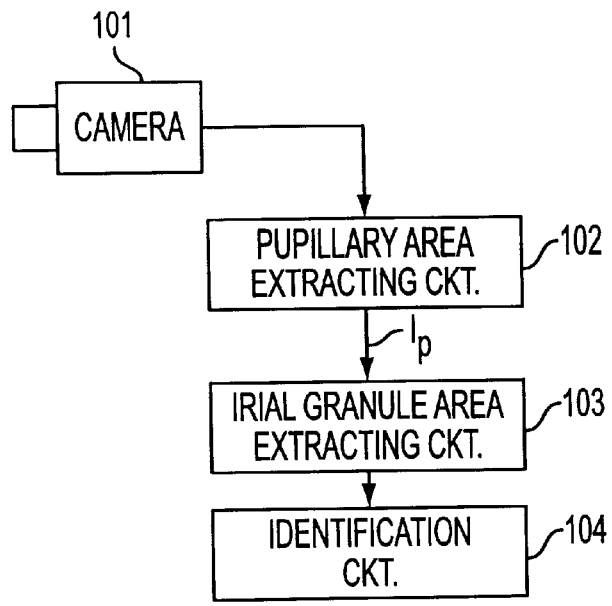
FIG. 11 is a block diagram which shows an animal identification system according to the second embodiment of the invention.

FIG. 11 shows an animal identification system according to the second embodiment of the invention.

The animal identification system includes a video camera 101, a pupilary area extracting circuit 102, an irial granule area extracting circuit 103, and an identification circuit 104.

The camera 101 is designed to capture an image of an eye of an animal such as a horse or cow in a digital form and provides it to the pupilary area extracting circuit 102.

The pupilary area extracting circuit 102 extracts from the input image the rectangular pupilary image Ip, as shown in FIG. 5(b), including the pupilary 10 and the irial granule 12 and provides it to the irial granule area extracting circuit 103.

The irial granule area extracting circuit 103 extracts an image of the irial granule 12 from the rectangular pupilary image Ip.

The identification circuit 104 identifies the animal captured by the camera 101 using the shape or texture of the irial granule 12 in the image extracted by the irial granule area extracting circuit 103.

The operation of the animal identification system of the second embodiment, especially the irial granule area extracting circuit 103 will be described below. Note that the irial granule 12 exists either on an upper half or a lower half of the pupil 10 according to the type of an animal to be identified.

Figure 12:
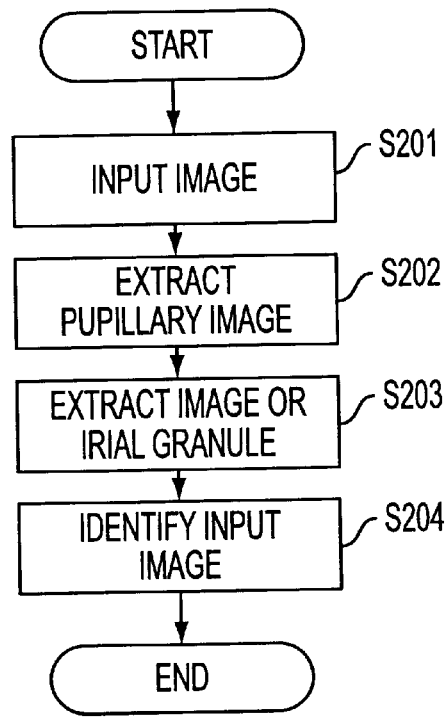
FIG. 12 is a flowchart of a program to extract an outline of an irial granule for animal identification.

FIG. 12 shows a flowchart of a program or sequence of logical steps performed by the animal identification system of the second embodiment.

First, a digital image captured by the camera 101 is inputted to the pupilary area extracting circuit 102 (step 201). The pupilary area extracting circuit 102 extracts from the input image the rectangular pupilary image Ip including the pupilary 10 and the irial granule 12 (step 202). The irial granule area extracting circuit 103 extracts an image of the irial granule 12 from the rectangular pupilary image Ip (step 203). Finally, the identification circuit 104 identifies the animal captured by the camera 101 using the shape or texture of the irial granule 12 in the image extracted by the irial granule area extracting circuit 103 (step 204).

The operations in steps 202 to 204 will be discussed below in detail.

[1] Extraction of Rectangular Pupilary Image Ip in Step 202

FIG. 13(a) shows the image of the eye which has been captured by the camera 101 and inputted to the pupilary area extracting circuit 102. FIG. 13(b) shows the rectangular pupilary image Ip extracted from the image of FIG. 13(a).

First, the input image is binary-coded using a gray level (i.e., a brightness level) of the darkest portion in the image. An image area of the pupil 10 is extracted from the binary-coded image. This extraction is achieved based on the fact that a pupilary area usually has the lowest brightness in an image of the eye.

Next, a rectangular area Rp, as shown in FIG. 13(a), including the extracted image area of the pupil 10 and an marginal image containing the irial granule 12 is defined in the input image. The rectangular area Rp has the width Wr and the height Hr, similar to the first embodiment.

The rectangular area Rp is extracted from the input image to produce the rectangular pupilary image Ip, as shown in FIG. 13(b). A coordinate system in which an upper left corner of the rectangular pupilary image Ip lies at the origin (0,0) and a lower right corner thereof lies at a point (Wr−1, Hr−1) is defined.

[2] Extraction of Irial Granule Area in Step 203

Figure 14:
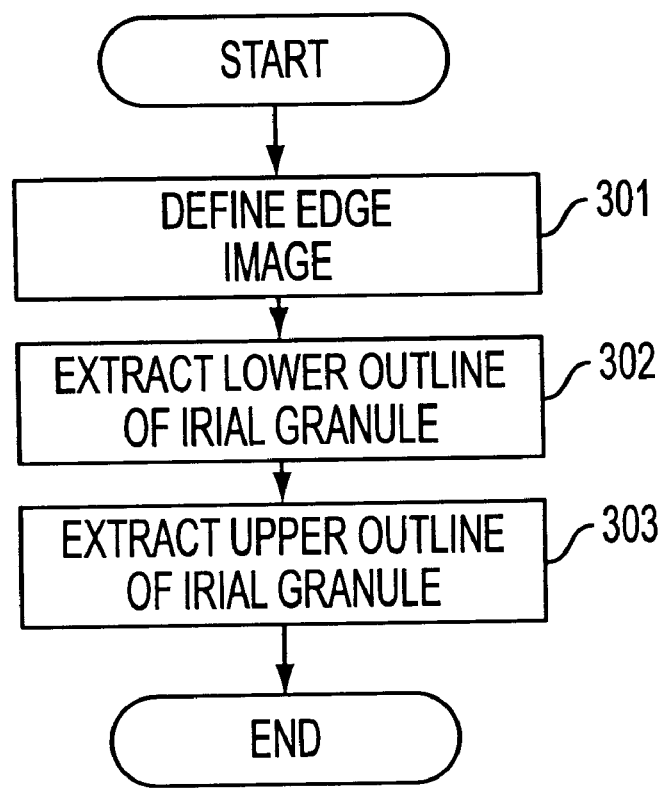
FIG. 14 is a flowchart of a program to extract an outline of an irial granule.

FIG. 14 shows a flowchart of a program logically performed by the irial granule area extracting circuit 103.

In step 301, discontinuities or edges are detected from the rectangular pupilary image Ip produced in step 102 by the pupilary area extracting circuit 102 to form an edge image id, as shown in FIG. 15(b). This edge detection may be achieved by, for example, an image differential operation using the Laplacian or the Sobel operator.

The edge image id may alternatively be produced by differentiating the rectangular pupilary image Ip in a vertical direction based on the fact that the brightness levels of the iris 11, the irial granule 12, and the pupil 10 have the relation of $$Di > Dg > Dp \tag{1}$$

Specifically, if the brightness level of each pixel of the rectangular pupilary image Ip is defined as DIP (x, y) ($0 \leq x < Wr$, $0 \leq y < Hr$), and the value of each pixel of the edge image id is defined as DID (x, y) ($0 \leq x < Wr$, $0 \leq y < Hr$), then the edge image id is produced according to the following equation.

$$DID(x, y) = DIP(x, y-1) - DIP(x, y) \tag{2}$$

where parameter x and y in the right term of Eq. (2) are variable within ranges of $0 \leq x < Wr$ and $1 \leq y < Hr$, respectively.

In the case where the irial granule 12 exists on an upper half of the pupil 10, the edge image id may alternatively be produced by detecting only edges oriented to a fixed direction according to Eq. (3) below based on the fact that the iris 11 has the highest brightness level, the irial granule 12 has a middle brightness level, and the pupil 10 has the lowest brightness level as viewed from an upper portion (i.e., a smaller value of y) of the rectangular pupilary image Ip.

If DIP(x, y−1)>DIP(x, y), then DID(x, y)=DIP(x, y−1)−DIP(x, y)

If DIP(x, y−1)<DIP(x, y), then DID(x, y)=0 \qquad (3)

where parameter x and y in the right term of Eq. (3) are variable within ranges of $0 \leq x < Wr$ and $1 \leq y < Hr$, respectively.

Even if either of the above edge detection techniques is used, pixels of the edge image Id showing greater edge intensity in the rectangular pupilary image Ip have greater values.

[2-2] Extraction of Outline of Lower Half of Irial Granule in Step 302

Figure 16:
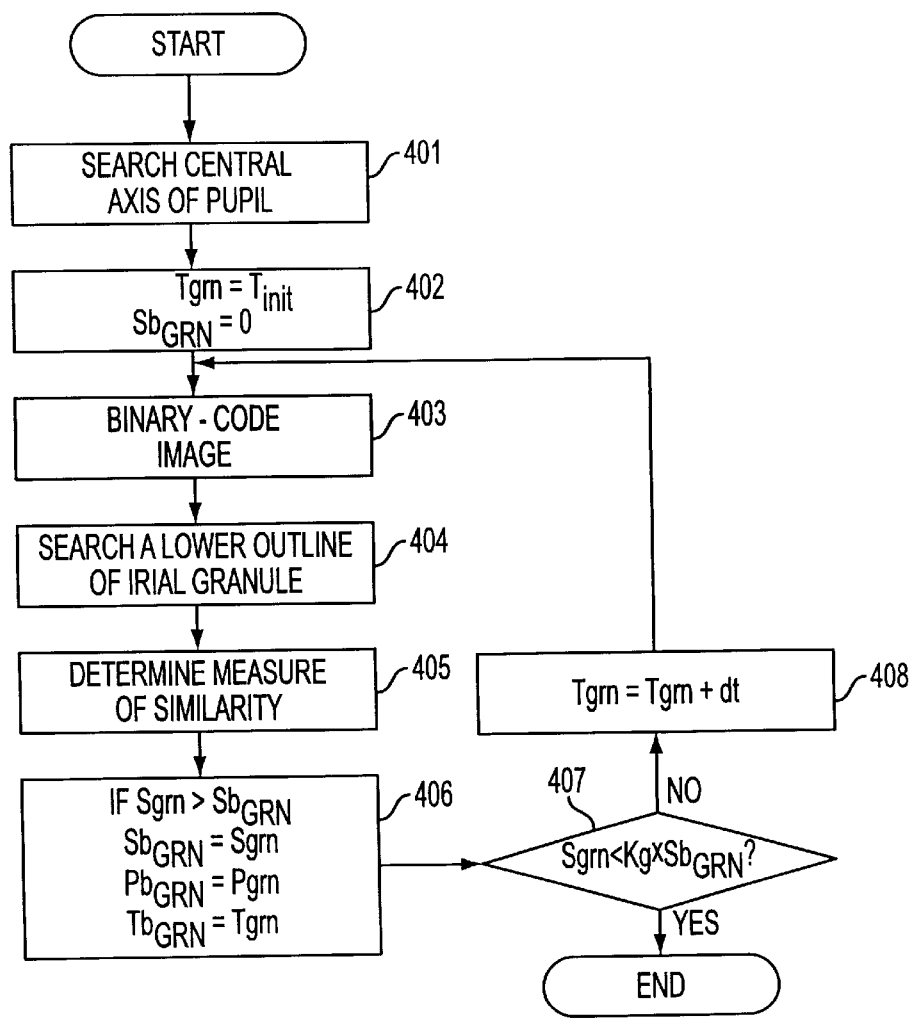
FIG. 16 is a flowchart of a program to extract an outline of a lower half of an irial granule.

FIG. 16 shows a flowchart of a program to extract an outline of a lower half of the irial granule 12.

In step 401, the position of a central axis of the pupil 10 extending in a vertical direction is searched. The central axis of the pupil 10 is defined by a normal extending through the center of the pupil 10 and expressed by x-y coordinates. The position of the central axis in a vertical direction (i.e., the y axis) is first searched in the following manner.

Figure 17A:
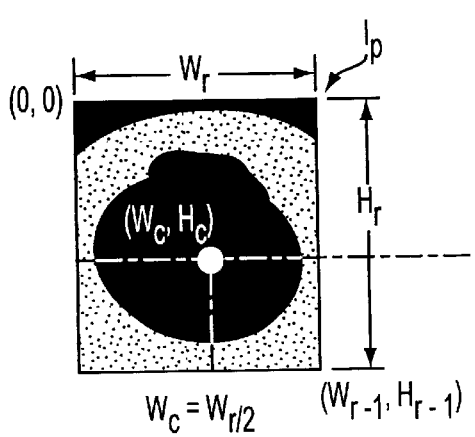
FIG. 17(a) is an illustration which shows a rectangular pupilary image.
Figure 17B:
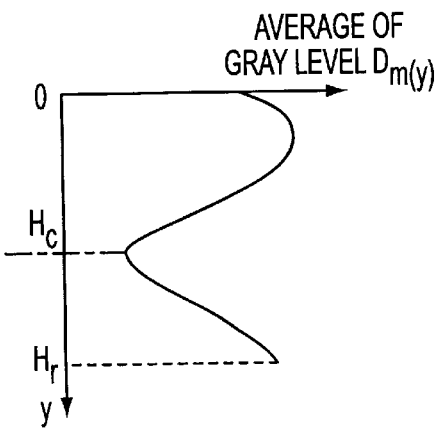
FIG. 17(b) is a histogram in terms of an average of gray levels in the image of FIG. 17(a)

First, the rectangular pupilary image Ip in FIG. 17(a) is projected in a horizontal direction to make a histogram, as shown in FIG. 17(b). The average of gray levels Dm(y) in the histogram is normalized, as expressed by Eq. (4) below, using the width Wr as a parameter.

$$Dm(y) = (\Sigma DIP(x, y))/W \tag{4}$$

where DIP(x, y) is the gray level of each pixel of the rectangular pupilary image Ip, y is a parameter variable within a range of $0 \leq y < Hr$, and $\Sigma$ is the sum total of DIP(x, y) where x is changed from one (1) to Wr.

The vertical position y (=Hc) of the central axis of the pupil 10 is determined as the value of y in the histogram when the frequency of Dm(y) (i.e., the average gray level) shows a minimum value. This is based on the fact that the average gray level of the pupil 10 in the rectangular pupilary image Ip is lower than those of any other portions thereof.

The horizontal position Wc of the central axis of the pupil 10 is determined as Wc=Wr/2. The vertical position y (=Hc) is, as described above, determined using the histogram since it cannot be determined easily from the pupilary area derived in step 202, but the horizontal position Wc may be determined as a horizontal center of the pupilary area derived in step 202.

In the above manner, the position of the central axis of the pupil 10 (i.e., the center of the pupil 10) is determined as (Wc, Hc).

After the center of the pupil 10 is determined as (Wc, Hc) in step 401, the routine proceeds to steps 402 to 408 to search the outline of the lower half of the irial granule 12.

In stop 402, a brightness threshold value Tgrn is set to an initial value Tinit, and a parameter SbGRN is set to zero (0). The initial value Tinit is a value much lower than the average gray level of the image area of the pupil 10.

In step 403, a binary-coded image IB of the rectangular pupilary image Ip (x, y) is produced according to Eq. (5) below using the brightness threshold value Tgrn.

If Ip(x, y)>Tgrn, then IB(Tgrn, x, y)=1

If Ip(x, y)<Tgrn, then IB(Tgrn, x, y)=0     (5)

The thus produced binary-coded image IB (Tgrn, x, y) shows an average gray level of the pupil 10 lower than those of any other portions. A change in Tgrn, thus, results in a change in pupilary boundary line (i.e., an outline of the pupil 10), but an area including the center of the pupil 10 in most cases will be an enclosed area showing the value of zero (0). When the brightness threshold value Tgrn is set to some value, it may cause the outline of the enclosed area to agree with the outline of the lower half of the irial granule 12 since the boundary line exists between the pupil 10 and the irial granule 12.

In step 404, the outline of an area including the center (Wc, Hc) of the pupil 10 or an area closest to the center (Wc, Hc) of the pupil in areas of the binary-coded image IB (Tgrn, x, y) showing the gray level of zero (0) are, as shown in FIGS. 18($b1$) to 18($b3$), searched in the following manner. For example, labels are added to pixels showing the gray level of zero (0) to produce an area(s) showing the gray level of zero (0). The distance between the center of gravity of the area(s) and the center (Wc, Hc) of the pupil 10 is calculated to select an area including the center (Wc, Hc) of the pupil 10 or an area closest to the center of the pupil 10 from among areas within the binary-coded image IB (Tgrn, x, y) showing the gray level of zero (0). Pixels surrounding the selected area are extracted from the binary-coded image IB as a pupilary outline.

It is possible that the thus extracted pupilary outline corresponds to the outline of the pupil 10 according to the brightness threshold value Tgrn. In other words, there is the possibility of agreement of a portion of the pupilary outline with the outline of the lower half of the irial granule 12 neighboring to the pupil 10.

Accordingly, it is checked whether a portion of the extracted pupilary outline corresponds to a portion of the edge image having a greater edge intensity or not to determine whether the extracted pupilary outline coincides with the outline of the lower half of the irial granule 12 or not in the following manner.

First, in step 405, a measure of similarity Sgrn(Tgrn) of the outline of the lower half of the irial granule 12 is determined using a string of dots representing the pupilary outline derived in step 404. For example, some of dots (i.e., pixels) making up a set pgrn(Tgrn) expressed by Eq. (6) below which lie above the center (Wc, Hc) of the pupil 10 and each of which is closest to the central axis y=Hc of the pupil 10 at one of x coordinates are selected. Specifically, a subset Pgrn(Tgrn) is determined according to Eq. (9) using a collection of dots meeting Eqs. (7) and (8) or using a collection of dots only meeting Eq. (8) if the set of dots pgrn(Tgrn) (i.e., each of dots having the smallest value of y at one of x coordinates) does not satisfy Eq. (7). Using elements of the edge image DID located at the same positions as those of the elements of the subset Pgrn(Tgrn), the measure of similarity Sgrn(Tgrn) is determined according to Eq. (10) below.

$$pgrn(Tgrn)=(xi(Tgrn), yi(Tgrn))$$

$$0 \leq i < np(Tgrn) \quad (6)$$

where np(Tgrn) is one of dots making up the area.

$$yi(Tgrn) < Hc$$

$$0 \leq i < np(Tgrn) \quad (7)$$

$$|Hc-yi(Tgrn)| < |Hc-yj(Tgrn)|$$

$$0 \leq i < np(Tgrn), \ 0 \leq j < np(Tgrn) \quad (8)$$

where yi and yj indicate different y-coordinates when xi=xj.

$$Pgrn(Tgrn)=(Xi(Tgrn), Yi(Tgrn))$$

$$0 \leq i < Np(Tgrn) \quad (9)$$

where Np(Tgrn) is the number of dots of the set.

$$Sgrn(Tgrn)=(\Sigma DID(Xi(Tgrn), Yi(Tgrn)) \div Np(Tgrn) \quad (10)$$

where S is the sum total of DID(Xi(Tgrn), Yi(Tgrn)) where i is changed from one (1) to (Np(Trgn)−1).

The measure of irial granule outline similarity Sgrn(Tgrn) derived by Eq. (10) indicates the average of edge intensities on an outline of one of areas of the binary-coded image IB(Tgrn, x, y) having the value of zero (0) that is closest to the center (Wc, Hc) of the pupil 10 or that includes the center (Wc, Hc) of the pupil 10. In other words, the measure of irial granule outline similarity Sgrn(Tgrn) indicates whether an upper half outline derived by handling the binary-coded image IB(Tgrn, x, y) formed using the latest brightness threshold value Tgrn coincides with an edge on the edge image or not.

Therefore, when the measure of irial granule outline similarity Sgrn(Tgrn) shows a great value, it means that the outline Pgrn(Tgrn)=(Xi(Tgrn, Yi(Tgrn)) of the upper half of the pupil 10 (i.e., the outline of the lower half of the irial granule 12) estimated from the binary-coded image IB(Tgrn, x, y) formed using the latest brightness threshold value Tgrn coincides with an edge derived by the difference in gray level between the pupil 10 and the irial granule 12.

In step 406, if the measure of irial granule outline similarity Sgrn(Tgrn) derived in this program execution cycle is greater than the measures of irial granule outline similarity SbGRN that is set to zero (0) in step 402 of the first program execution cycle, then the measure of irial granule outline similarity SbGRN is updated by the measure of irial granule outline similarity Sbrn(Tgrn), and the subset Pgrn(Tgrn) and the threshold value Tgrn are determined as PbGRN and TbGRN.

In step 407, it is determined using Eq. (11) below whether the measure of irial granule outline similarity Sgrn(Tgrn) derived in this program execution cycle is smaller than the product of a given value and the measure of irial granule outline similarity SbGRN derived in the previous program execution cycle or not. If a YES answer is obtained meaning that it is impossible to produce the outline of the lower half of the irial granule 12 in a subsequent program execution cycle which is better than that derived in this program execution cycle, then the routine terminates. Alternatively, if a NO answer is obtained in step 407, then the routine proceeds to step 408 wherein the brightness threshold value Tgrn is updated (Tgrn=Tgrn+dt).

$$Sgrn(Tgrn) < Kg \times SbGRN \quad (11)$$

where Kg is a real number of the order of 0.5 to 1.0 which is selected for preventing the measure of irial granule outline similarity Sgrn(Tgrn) from converging on a local peak value. Note that the increment dt used in step 408 is a natural number of 1 or 2.

If step 408 is repeated to increase the brightness threshold value Tgrn stepwise, then the measure of irial granule outline similarity Sgrn(Tgrn) is gradually increased up to the peak and then decreased. Step 407 monitors the peak of the outline of the lower half of the irial granule 12 during the change in Sgrn(Tgrn).

The images binary-coded using the brightness threshold values Tgrn=t1, t2, and t3 (t1<t2<t3) are shown in FIGS. 18(*b*1) to 18(*b*3). The dark portions of the images in FIGS. 18(*b*1) to 18(*b*3) are areas showing gray levels lower than the brightness threshold values Tgrn, respectively. FIG. 18(*c*) shows the edge image. The measure of irial granule outline similarity Sgrn(Tgrn) is determined by applying the edge image to each of strings of dots Pgrn(t1), Pgrn(t2), and Pgrn(t3) representing the outlines extracted from the binary-coded images in FIGS. 18(*b*1) to 18(*b*3). In this embodiment, the string of dots Pgrn(t3) derived from the binary-coded image in FIG. 18(*b*3) matches with the edge image and is extracted as the outline of the lower half of the irial granule 12.

The image of the pupil 10 may exhibit the gradation or get light or dark as a whole depending upon environmental conditions when the image is picked up by the camera 101 and the location of a source of light. For this reason, it is necessary to find a suitable threshold value required to discriminate between the pupil 10 and the irial granule 12 in each image by measuring the edge intensity of the outline while changing the threshold value.

Upon completion of the above extraction of the outline of the lower half of the irial granule 12, the outline of the upper half of the irial granule 12 is extracted in the following manner.

[2-3] Extraction of Outline of Upper Half of Irial Granule in Step 304

Figure 19:
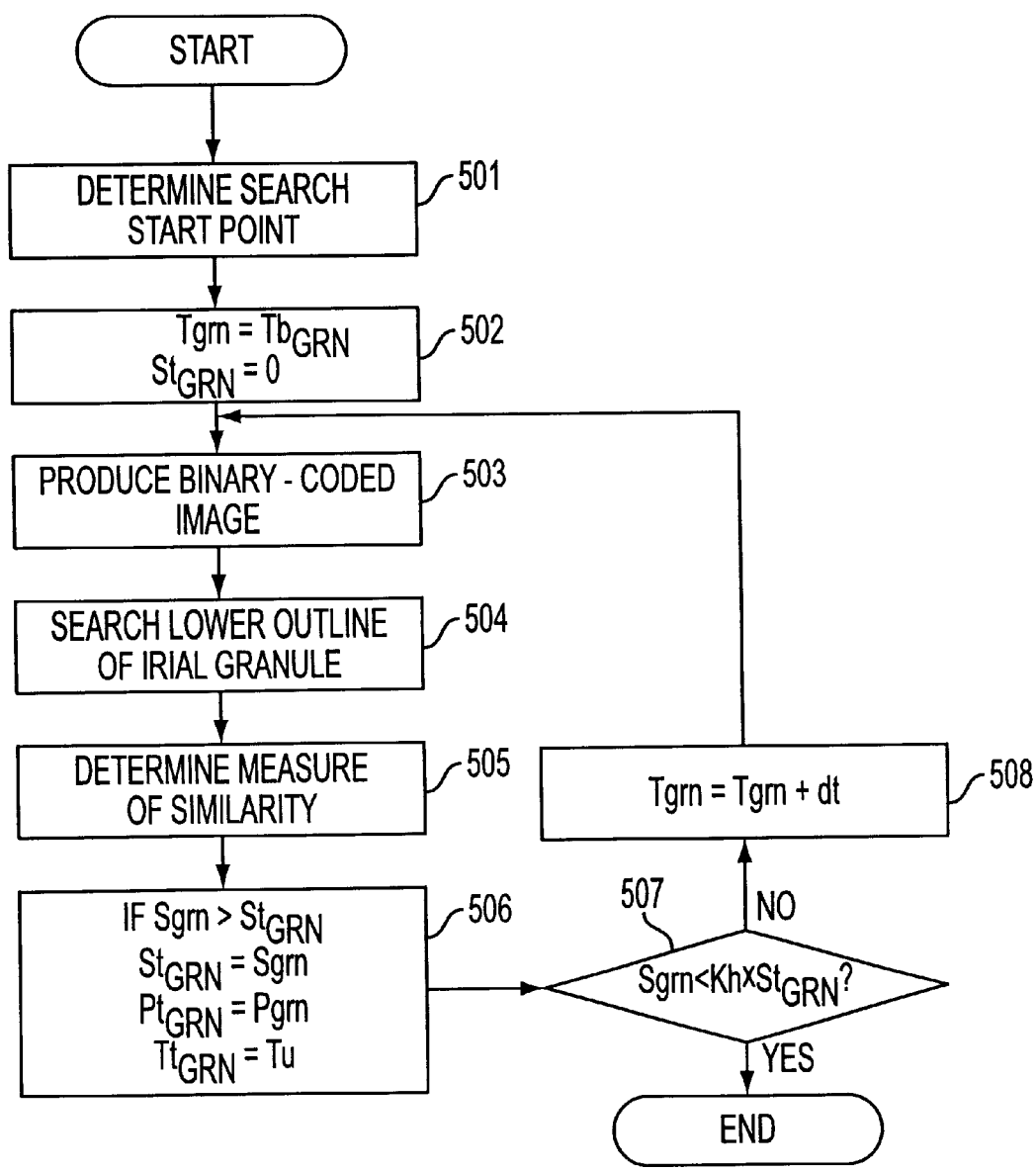
FIG. 19 is a flowchart of a program to extract an outline of an upper half of a pupil.

FIG. 19 shows a flowchart of a program to extract an outline of the upper half of the irial granule 12.

Figure 20A:
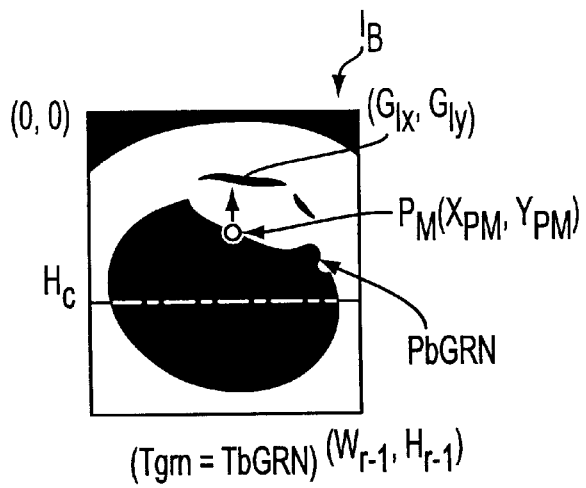
FIG. 20(a) is an illustration which shows a rectangular pupilary image.
Figure 20:
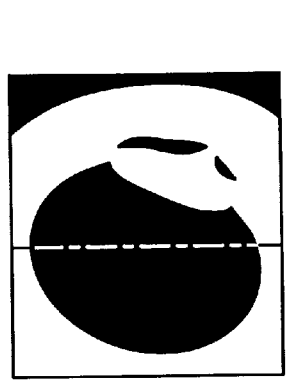
FIGS. 20(b1) to 20(b3) are illustrations which show images of a pupil produced with different brightness threshold values.
Figure 20:
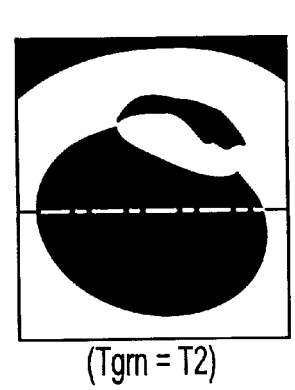

First, in step 501, a search start point of the outline of the upper half of the irial granule 12 is determined. The irial granule 12 is, as described above, a protrusion having a three-dimensional shape and has an irregular surface. This causes shadows having substantially the same gray level as that of the pupil 10 to appear, in an image picked up by the camera 101, at the boundary between the irial granule 12 and the iris 11 and/or on the surface of the irial granule 12. These shadows usually have gray levels near the threshold value TbGRN derived in the extraction of the outline of the lower half of the irial granule 12 and also appear on an image, as shown in FIG. 20(*a*), which is derived by binary-coding the rectangular pupilary image Ip. The search start point of the outline of the upper half of the irial granule 12 is, thus, determined using the threshold value TbGRN in the following manner.

The center PM (XPM, YPM) of the outline PbGRN of the lower half of the irial granule 12 is determined as $$PM(XPM, YPM)=\{(Xn(TGRN), Yn(TGRN))\} \quad (12)$$

where n=(Np/2)−1

The rectangular pupilary image Ip is binary-coded using the brightness threshold value TbGRN derived in step 406 of FIG. 16 to produce a binary-coded image IB(Tgrn, x, y), as shown in FIG. 20(*a*). The value of each pixel of the binary-coded image IB(Tgrn, x, y) is searched upwards from the center PM(XPN, YPM) to find a first pixel of zero (0). The first pixel of zero (0) is determined as the search start point (GIx, GIy) of the outline of the upper half of the irial granule 12. Specifically, the search start point (GIx, GIy) meets Eqs. (13) and (14) below.

$$GIx=XPM \quad (13)$$

$$YPM>GIy \geq y \quad (14)$$

where y meets the relations of IB(TbGRN, GIx, y)=0 and 0<y<YPM.

If the coordinate GIy meeting Eqs. (13) and (14) is not found, then a given value dx is added to GIx to find a corresponding coordinate GIy. This operation is repeated until the coordinate GIy meeting Eqs. (13) and (14) is found. The increment dx is an integer of the order of −4/Np to 4/Np. If the coordinate GIy meeting Eqs. (13) and (14) is not yet found, then a given value dtb (a small natural number) is added to the brightness threshold value TbGRN, and the above operation is repeated.

After the search start point (GIx, GIy) is found, several parameter are initialized in step 502. Specifically, the threshold value Tgrn is set to an initial value of TbGRN, and the parameter StGRN is set to zero (0). If the threshold value TbGRN has been updated by the increment dtb in step 501, then the threshold value Tgrn is set to the updated threshold value TbGRN.

In step 503, the rectangular pupilary image Ip is binary-coded using the latest threshold value Tgrn to produce the binary-coded image IB(Tgrn, x, y).

In step 504, one of the areas showing the value of zero (0) in the binary-coded image IB(Tgrn, x, y) which includes the search start point (GIx, GIy) is searched to extract an outline thereof. The outline may be viewed as the outline of the irial granule 12. In other words, it is possible that the extracted outline corresponds to the outline of the upper half of the irial granule 12 neighboring the iris 11.

Accordingly, it is checked whether the extracted outline corresponds to a portion of the edge image having a greater edge intensity or not to determine whether the extracted outline coincides with the outline of the upper half of the irial granule 12 or not in the following manner.

In step 505, a measure of similarity Sgrn(Tgrn) of the outline of the upper half of the irial granule 12 is determined using a string of dots representing the outline derived in step 504. For example, some of dots (i.e., pixels) making up a set pgrn(Tgrn) expressed by Eq. (15) below which lie above the center (Wc, Hc) of the pupil 10 and each of which is closest to the central axis y=Hc of the pupil 10 at one of x coordinates are selected. Specifically, a subset Pgrn(Tgrn) is determined according to Eq. (18) using a collection of dots meeting Eqs. (16) and (17). Using elements of the edge image DID located at the same positions as those of the elements of the subset Pgrn(Tgrn), the measure of similarity Sgrn(Tgrn) is determined according to Eq. (10) above.

$$pgrn(Tgrn)=(xi(Tgrn), yi(Tgrn))$$

$$0 \leq i < np(Tgrn) \quad (15)$$

where np(Tgrn) is one of the dots making up the area.

$$yi(Tgrn)<Hc$$

$$0 \leq i < np(Tgrn) \quad (16)$$

$$|Hc-yi(Tgrn)|>|Hc-yj(Tgrn)|$$

$$0 \leq i < np(Tgrn), \ 0 \leq j < np(Tgrn) \quad (17)$$

where yi and yj indicate different y-coordinates when xi=xj.

$$P_{grn}(T_{grn}) = (X_i(T_{grn}), Y_i(T_{grn}))$$

$$0 \leq i < N_p(T_{grn}) \quad (18)$$

where Np(Tgrn) is the number of dots of the set.

Similar to the measure of irial granule outline similarity used to extract the outline of the upper half of the irial granule 12, when the measure of irial granule outline similarity Sgrn(Tgrn) shows a greater value, it means that the outline Pgrn(Tgrn)=(Xi(Tgrn, Yi(Tgrn)) of the upper half of the irial granule 12 estimated from the binary-coded image IB(Tgrn, x, y) formed using the latest brightness threshold value Tgrn coincides with an edge derived by the difference in gray level between the pupil 10 and the irial granule 12.

In step 506, if the measure of irial granule outline similarity Sgrn(Tgrn) derived in this program execution cycle is greater than the measures of irial granule outline similarity StGRN that is set to zero (0) in step 502 of the first program execution cycle, then the measure of irial granule outline similarity StGRN is updated by the measure of irial granule outline similarity Sbrn(Tgrn), and the subset Pgrn(Tgrn) representing the outline of the upper half of the irial granule 12 and the brightness threshold value Tgrn are determined as PtGRN and TtGRN.

In step 507, it is determined using Eq. (19) below whether the measure of irial granule outline similarity Sgrn(Tgrn) derived in this program execution cycle is smaller than the product of a given value and the measure of irial granule outline similarity StGRN derived in the previous program execution cycle or not. If a YES answer is obtained meaning that it is impossible to produce the outline of the upper half of the irial granule 12 in a subsequent program execution cycle which is better than that derived in this program execution cycle, then the routine terminates. Alternatively, if a NO answer is obtained in step 507, then the routine proceeds to step 508 wherein the brightness threshold value Tgrn is updated (Tgrn=Tgrn+dt).

$$S_{grn}(T_{grn}) < K_h \times StGRN \quad (19)$$

where Kh is a real number of the order of 0.5 to 1.0 which is selected for preventing the measure of irial granule outline similarity Sgrn(Tgrn) from converging on a local peak. Note that the increment dt used in step 508 is a natural number of 1 or 2.

The set of dots PtGRN derived in the program execution cycle when the routine terminates indicates the outline of the upper half of the irial granule 12.

Figure 20C:
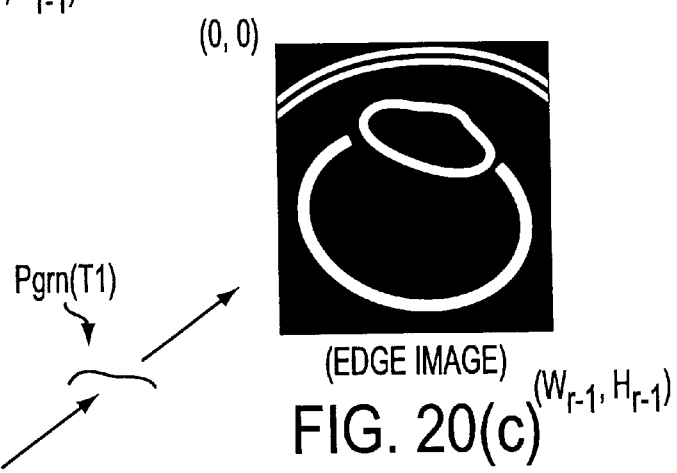
FIG. 20(c) is an illustration which shows an edge image of FIG. 20(a)
Figure 20:
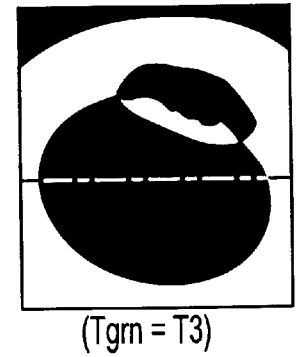

The images binary-coded using the brightness threshold values Tgrn=T1, T2, and T3 (T1<T2<T3) are shown in FIGS. 20(b1) to 20(b3). The dark areas on the images in FIGS. 20(b1) to 20(b3) are areas showing gray levels lower than the brightness threshold values Tgrn, respectively. FIG. 20(c) shows the edge image. The measure of irial granule outline similarity Sgrn(Tgrn) is determined by applying the edge image to each of strings of dots Pgrn(T1), Pgrn(T2), and Pgrn(T3) representing the outlines extracted from the binary-coded images in FIGS. 20(b1) to 20(b3). In this embodiment, the string of dots Pgrn(T3) derived from the binary-coded image in FIG. 20(b3) matches with the edge image and is extracted as the outline of the upper half of the irial granule 12.

[3] Identification Based on Irial Granule Analysis in Step 204

The animal identification is performed using the outlines of the upper and lower halves of the irial granule 12 in the pattern matching method. For example, it is achieved by comparing the outline of the irial granule 12 determined in the above manner with reference irial granule outlines stored in a registration dictionary to find one of the reference irial granule outlines which is closest to the outline of the irial granule 12.

The information on the histogram used in determining the horizontal center of the pupil 10 may also be employed for the animal identification.

The search start point of the outline of the lower half of the irial granule 12 is the center of the pupil 10, but it may be the center of gravity of an area of the pupil 10 in an binary-coded image used to extract the rectangular pupilary image Ip.

The search start point of the outline of the upper half of the irial granule 12 is also not limited to the one as described above and may be set to a point lying above the center of the outline of the lower half of the irial granule 12 at a fixed interval. The search start point may alternatively be determined based on the center of gravity of a binary-coded image representing the irial granule 12, formed by using two brightness threshold values. In this case, it is possible to extract the outline of the upper half of the irial granule 12 prior to extracting the outline of the lower half thereof. It is also possible to extract the outlines of the upper and lower halves of the irial granule 12 simultaneously.

The outlines of the upper and lower halves of the irial granule 12 are apprised by use of the edge image produced in terms of the edge intensity, but may also be apprised by use of an additional edge image produced by binary-coding the first edge image. For example, the outlines of the upper and lower halves of the irial granule may be apprised based on measures of similarity between the upper and lower halves of the irial granule and edge lines on the binary-coded edge image.

Figure 21:
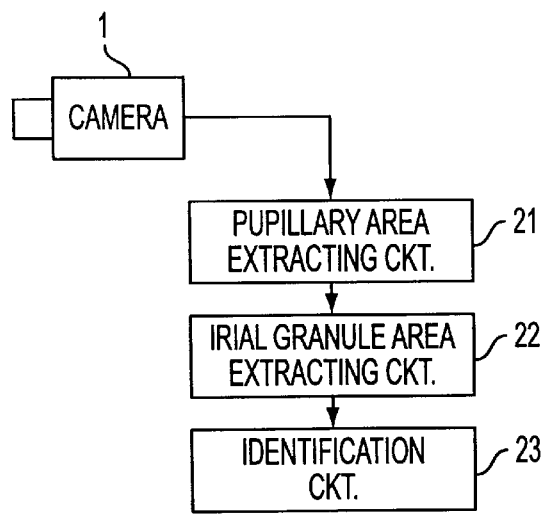
FIG. 21 is a block diagram which shows an animal identification system according to the third embodiment of the invention.

FIG. 21 shows art animal identification system according to the third embodiment of the invention.

The animal identification system includes a camera 1, a pupilary area extracting circuit 21, an irial granule area extracting circuit 22, and an identification circuit 23.

The camera 1 captures an image of an eye of an animal such as horse or cattle in a digital form and provides it to the pupilary area extracting circuit 21. The pupilary area extracting circuit 21 extracts from the input image the rectangular pupilary image Ip, as shown in FIG. 5(b), including the pupilary 10 and the irial granule 12 and provides it to the irial granule area extracting circuit 22. The irial granule area extracting circuit 22 extracts an image of the irial granule 12 from the rectangular pupilary image Ip. The identification circuit 23 identifies the animal captured by the camera 1 using the shape or texture of the irial granule 12 in the image extracted by the irial granule area extracting circuit 22.

The discussion below refers to extracting an irial granule existing on an upper portion of the pupil, but the extraction of an irial granule existing on a lower portion of the pupil can be achieved by reversing parameters, as used below, vertically.

Figure 22:
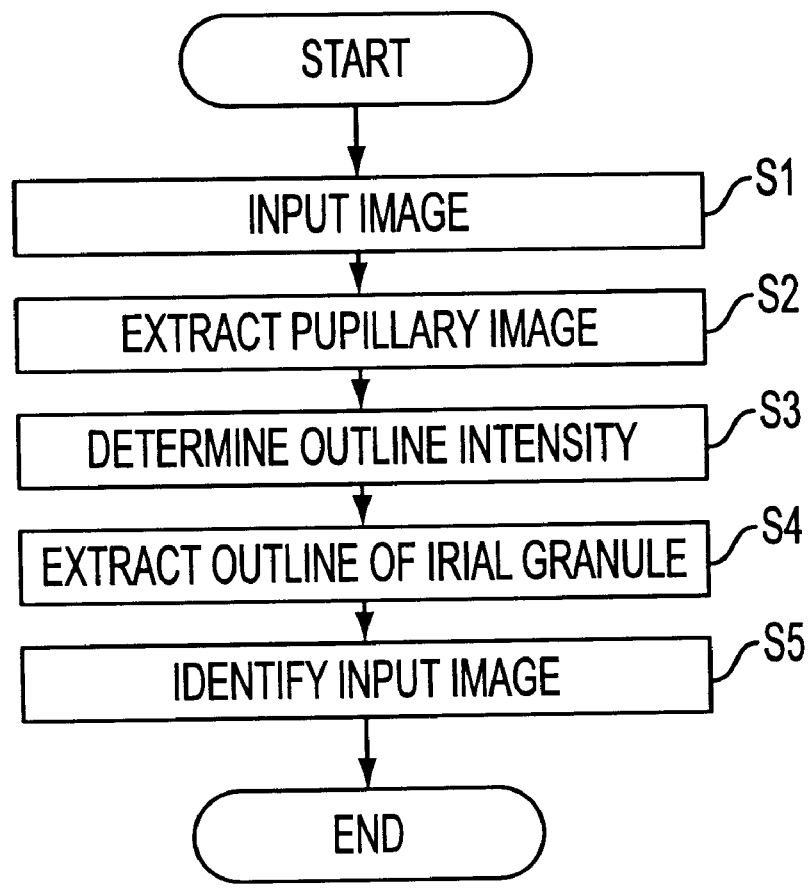
FIG. 22 is a flowchart of a program performed by the animal identification system in FIG. 21.

FIG. 22 shows a flowchart of a program or sequence of logical steps performed by the animal identification system of the third embodiment.

First, a digital image captured by the camera 1 is inputted to the pupilary area extracting circuit 21 (step 1). The pupilary area extracting circuit 21 extracts from the input image the rectangular pupilary image Ip (step 2). The irial granule area extracting circuit 22 determines the intensity of an outline (step 3) and extracts an image of the irial granule from the rectangular pupilary image Ip (step 4). Finally, the identification circuit 23 identifies the animal captured by the camera 1 using the shape or texture of the irial granule in the image extracted by the irial granule area extracting circuit 22 (step 5).

The operations in the above steps will be discussed below in detail.

[1] Extraction of Rectangular Pupilary Image Ip in Step 2

Figure 23A:
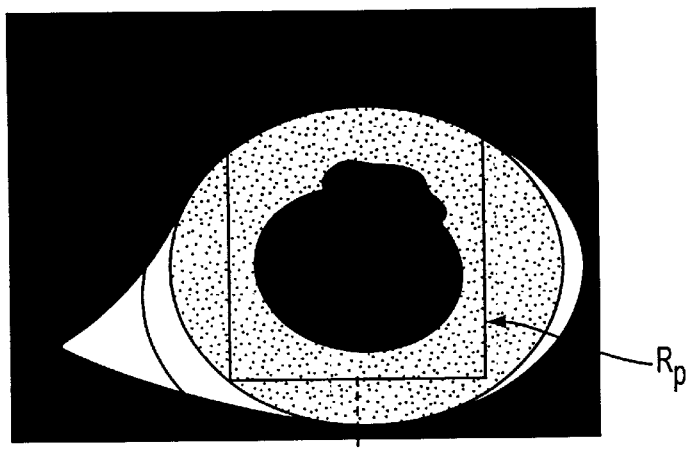
FIG. 23(a) is an illustration which shows an image of an eye.

FIG. 23(a) shows the image of the eye captured by the camera 1 and inputted to the pupilary area extracting circuit 21. FIG. 13(b) shows the rectangular pupilary image Ip extracted from the image of FIG. 23(a).

Figure 23B:
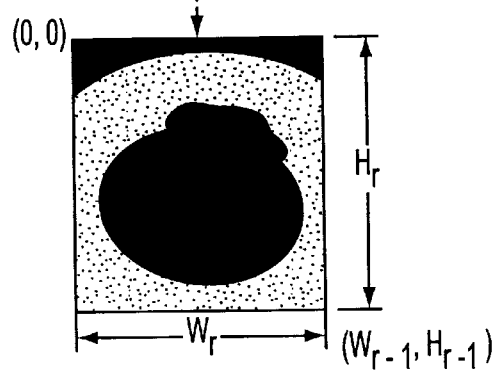
FIG. 23(b) is an illustration which shows a rectangular pupilary image extracted from the image in FIG. 23(a)

First, the input image is binary-coded using a gray level of the darkest portion in the image. An image area of the pupil is extracted from the binary-coded image. Next, a rectangular area Rp, as shown in FIG. 23(a), including the extracted image area of the pupil and an marginal image containing the irial granule is defined in the input image. The rectangular area Rp has the width Wr and the height Hr, similar to the first embodiment. The rectangular area Rp is extracted from the input image to define the rectangular pupilary image Ip, as shown in FIG. 23(b), in a coordinate system in which an upper left corner of the rectangular pupilary image Ip lies at the origin (0,0) and a lower right corner thereof lies at a point (Wr−1, Hr−1).

[2] Determination of Intensity of Outline in Step 3

Figure 24:
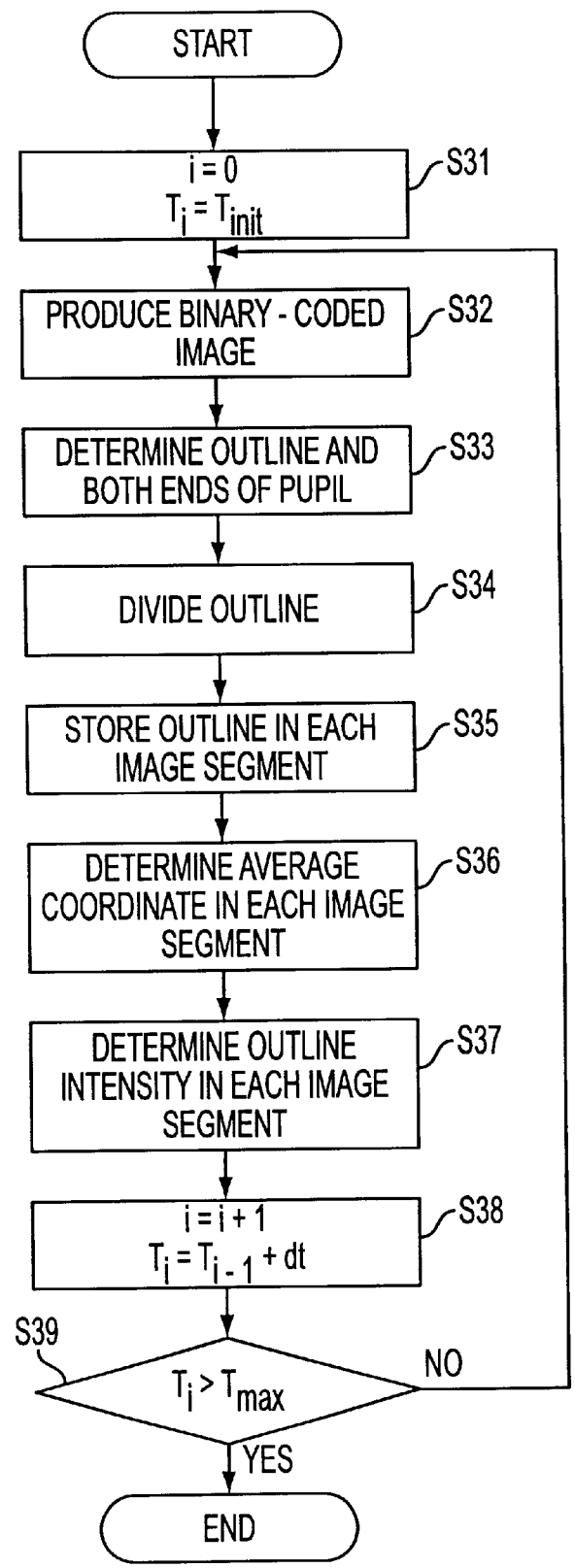
FIG. 24 is a flowchart of a program to determine average coordinates and outline intensities in image segments.

FIG. 24 shows a flowchart of a program logically performed in the irial granule area extracting circuit 22 to determine the intensity of an outline of the pupil.

The determination of the intensity of the outline of the pupil is made by repeating steps 32 to 39, as described below in detail, while increasing a threshold value from T0=Tinit in increments of dt (dt is a small natural number). If Ti>Tmax in step 39, the routine terminates.

In step 31, the threshold value Ti is set to an initial value Tinit. In step 32, the rectangular pupilary image Ip is binary-coded using the threshold value Ti. In step 33, an area darker than the threshold value Ti is defined as an objective area P(Ti), and an outline of the objective area P(Ti) is searched. Both ends of the objective area P(Ti) are determined as E1(Ti) and E2(Ti). A portion of the outline passing through the ends E1(Ti) and E2(Ti) located lowest in a direction in which a value of y is increased is defined as a pupilary lower outline. The intensity and average coordinates of the outline excluding the pupilary lower outline, as will be described later in detail, are determined. When an area brighter than the threshold value Ti (i.e., an area having a gray level higher than Tb in FIG. 27(a)) exists in the objective area P(Ti), the intensity and an average coordinate of an outline of that area is also determined.

In step 34, the rectangular pupilary image is, as shown in FIGS. 26(b) and 27(b), divided in a lateral direction into N pieces (N is a natural number) which will be referred to as image segments Rj below (0≦j<N, j=natural number). The determination of the intensity and an average coordinate of the outline is made in each of the image segments.

Specifically, in each of the image segments Rj, the intensities and average coordinates of uppermost and lowermost portions of the outline of the objective area P(Ti) are determined in the following manner.

Here, in each of the image segments Rj, a set of dots (i.e., pixels) representing the uppermost portion of the outline of the objective area P(Ti) derived based on the threshold value Ti is defined as U.crd(Ti, Rj), the intensity thereof is defined as U.pow(Ti, Rj), an average coordinate thereof is defined as U.pos, and data on a combination of U.crd(Ti, Rj), U.pow (Ti, Rj), and U.pos is defined as U(Ti, Rj). Similarly, in each of the image segments Rj, a set of dots representing the lowermost portion of the outline excluding the pupilary lower outline is defined as L.crd(Ti, Rj), the intensity thereof is defined as L.pow(Ti, Rj), an average coordinate thereof is defined as P.pos, and data on a combination of L.crd(Ti, Rj), L.pow(Ti, Rj), and L.pos is defined as L(Ti, Rj).

[2]-1 Explanation of Sets of Dots U.crd and L.crd (step 35 in FIG. 24)

U.crd and L.crd represent lines which have the same intensity and which will be candidate set of dots representing upper and lower outlines of an image of the irial granule based on the fact that in the rectangular pupilary image Ip, the iris, the irial granule, and the pupil have constant gray levels different from each other.

If the number of elements in each of U.crd and L.crd is defined as M, then U.crd and L.crd are expressed as U.crd(Ti, Rj)={(Xuij0, Yuij0), (Xuij1, Yuij1), . . . , (XuijM−1, YuijM−1)}

L.crd(Ti, Rj)={(Xlij0, Ylij0), (Xlij1, Ylij1), . . . , (XlijM−1, YlijM−1)}

[2]-2 Explanation of Average Coordinates U.pos and L.pos (step 36)

U.pos and L.pos indicate, as can be seen in (a) of a table I of FIG. 28, average values of y-coordinates of U.crd and L.crd, respectively.

[2]-3 Explanation of Outline Intensities U.pow and L.pow (Step 37)

The outline intensity is an average value of intensities of edges on the outline of the objective area in the rectangular pupilary image Ip. While the discussion below refers only to mathematical determination of the edge intensity U.pow(Ti, Rj) of U.crd(Ti, Rj) in the image segment Rj, the edge intensity L.pow(Ti, Rj) can be determined in the same manner.

The edge intensity POW at point Q(x, y) (0≦x<Wr, 0≦y<Hr) in the rectangular pupilary image Ip is determined in a differential operation using the Laplacian or Sobel operator. Vertical differential is also employed using the fact that in the rectangular pupilary image Ip, the iris, the irial granule, and the pupil have gray levels Di, Dg, and Dp meeting the relation of Di>Dg>Dp. Note that an image having a greater gray level is perceived brightly. In practice, if the gray level of each pixel in the rectangular pupilary image Ip is defined as DIP(x, y) (0≦x<Wr, 0≦y<Hr), then the edge intensity POW is given by a formula shown in (b) of the table I in FIG. 28. Specifically, the edge intensity POW is determined by subtracting the gray level DIP(x, y) of an objective pixel from the gray level DIP(x, y−1) of a pixel located just above the objective pixel.

When the irial granule lies on an upper portion of the pupil in the rectangular pupilary image Ip, the iris has the highest gray level, the irial granule has a middle gray level, and the pupil has the lowest gray level. In this case, in order to enhance only edges oriented in a specified direction, the edge intensity POW may be expressed as shown in (c) of the table I in FIG. 28.

The greater the difference in gray level between a specified dot and an adjacent dot in the rectangular pupilary image Ip, the higher value the edge intensity of the specified dot has. The edge intensities of all dots in the image may be determined in sequence or alternatively be determined simultaneously in advance.

The outline intensity U.pow(Ti, Rj) is an average value of edge intensities of elements of U.crd(Ti, Rj) and expressed by a formula, as shown in (d) of the table I in FIG. 28.

The measurement of the outline intensity will be described below with reference to FIGS. 25 to 27(c).

Figure 25:
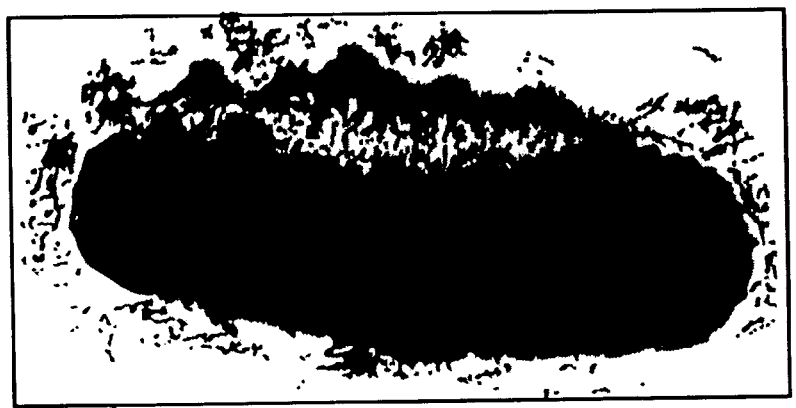
FIG. 25 shows a rectangular pupilary image.

FIG. 25 shows the rectangular pupilary image. FIG. 26(a) shows an image derived by binary-coding the rectangular pupilary image of FIG. 25 using the threshold value Ti=TA. FIG. 26(b) shows an outline of the objective area P(TA) of the binary-coded image of FIG. 26(a) (an operation in step 32 of FIG. 24). A portion (i.e., a broken line in the drawing) of the outline appearing below a line segment connecting left and right ends E1(TA) and E2(TA) is defined as the pupilary lower outline. The pupilary lower outline is divided equally in a horizontal direction into N pieces which are defined as units in determining the outline intensity (an operation in step 34 of FIG. 24).

FIG. 26(c) shows one of the image segments Rj. In the shown image segment Rj, there is only one outline segment except the pupilary lower outline, so that U(TA, Rj)=L(TA, Rj).

FIG. 27(a) shows an image derived by binary-coding the rectangular pupilary image using the threshold value Ti=TB greater than TA. FIG. 27(b) shows an outline of the binary-coded image of FIG. 27(a). If there is, as shown in FIG. 27(a), an area having a gray level greater than the threshold value within an objective area, an outline of the periphery of that area is also extracted.

FIG. 27(c) shows one of the image segments Rj of FIG. 27(b). In the shown image segment Rj, there are three outline segments except the pupilary lower outline. In this case, the uppermost outline segment is defined as U(TB, Rj), while the lowermost outline segment is defined as L(TB, Rj).

[3] Extraction of Outline of Irial Granule (Step 4)

Figure 29:
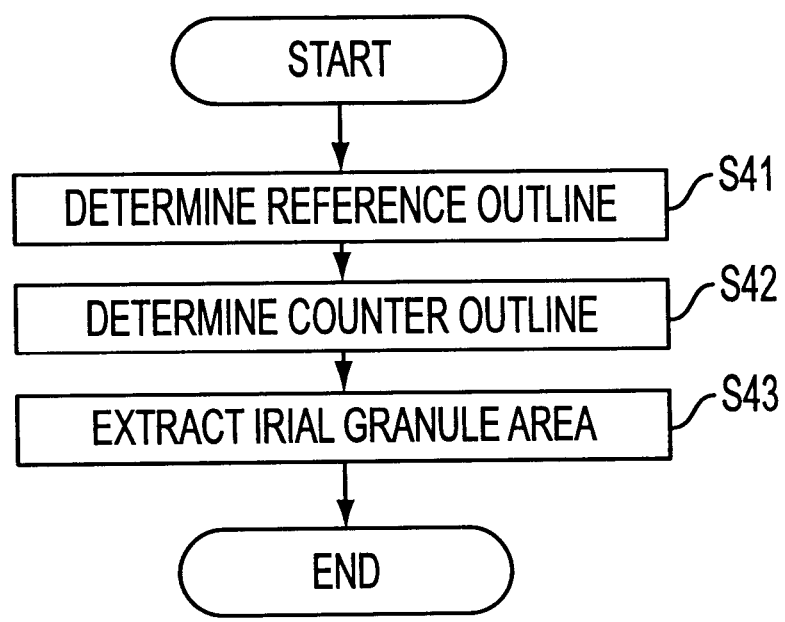
FIG. 29 is a flowchart of a program to extract an irial granule from a rectangular pupilary image.

FIG. 29 shows a flowchart of a program performed in the irial granule outline extracting step 4 of FIG. 22.

[3]-1 Determination of Reference Outline (Step 41)

After the threshold value Ti is increased from Tinit to Tmax, and the average coordinates and outline intensities of U(Ti, Rj) and L(Ti, Rj) are all determined, one of the image segments showing the highest intensity is determined and substituted into a reference outline E(Rj) ($0 \leq j < N$).

The outline intensity of U(Ti, Rj) is the greatest in the image segment Rj ($0 \leq j < N$) when the threshold value Ti=Ta. Specifically, the outline intensity when U.pow(Ta, Rj)$\geq$U.pow(Ti, Rj) (Tinit$\leq$Ti<Tend) and Ti=Tb is the greatest. Specifically, if L.pow(Tb, Rj)$\geq$L.pow(Ti, Rj) (Tinit$\leq$Ti<Tend), either of U(Ta, Rj) and L(Tb, Rj) having the greater outline intensity is substituted into E(Rj) as shown below.

(1) If U.pow(Ta, Rj)$\geq$L.pow(Tb, Rj),
then E.crd(Rj)=U.crd (Ta, Rj) (Substitute all elements)
E.pos(Rj)=U.pos(Ta, Rj)
E.pow(Rj)=U.pow(Ta, Rj)
E.thd(Rj)=Ta (2) If U.pow(Ta, Rj)<L.pow(Tb, Rj),
then E.crd(Rj)=L.crd (Tb, Rj) (Substitute all elements)
E.pos(Rj)=L.pos(Tb, Rj)
E.pow(Rj)=L.pow(Tb, Rj)
E.thd(Rj)=Tb where Ecrd(Rj) indicates a set of dots constituting the reference outline, E.pos(Rj) indicates an average coordinate of the reference outline, E.pow(Rj) indicates an outline intensity of the reference outline, and E.thd(Rj) indicates a threshold value used to extract the reference outline.

In the rectangular pupilary image Ip, an outline of the irial granule has the highest edge intensity except the lower outline of the pupil, therefore, the reference outline E(Rj) represents either of the upper and lower outlines of the irial granule.

[3]-2 Determination of Counter Outline (Step 42)

In step 42, a mate to the reference outline is determined which will be referred to as a counter outline below. For instance, when the reference outline is the upper outline of the irial granule, the counter outline represents the lower outline thereof Alternatively, when the reference outline is the lower outline of the irial granule, the counter outline represents the upper outline thereof. The determination of whether the reference outline is the upper outline or the lower outline of the irial granule is, however, made in a subsequent step.

A three-dimensional irregular portion, as already described, exists inside the irial granule whose shadow may have a higher edge intensity locally in the image. Additionally, the edge intensity of the outline of the irial granule may be lowered due to shading off of the image. The counter outline is, therefore, defined on the condition that the outline intensity is great, and the distance to the reference outline is great sufficiently. As a score numerical value given to a candidate line of the counter outline, the product of the outline intensity and the distance to the reference outline is used. Note that an upper limit of a term of the distance is defined as POSmax in order to avoid dispersion of the term of the distance. The score is not limited to the product as long as it is given to the candidate outline in proportion to the outline intensity and the distance to the reference outline.

The counter outline is determined, as discussed below, under each of the conditions that the reference outline is an upper outline of the irial granule and that the reference outline is a lower outline of the irial granule.

[3]-2-(1) Assume that the reference outline is the lower outline of the irial granule In one of the image segments Rj ($0 \leq j < N$), UD1(Ti, Rj) and LD1(Ti, Rj), as shown in (a) of the table II in FIG. 30, are determined with respect to Tinit$\leq$Ti<Tmax. Note that UD1(Ti, Rj) and LD1(Ti, Rj) represent scores of the uppermost outline and the lowermost outline under the condition that the reference outline is the lower outline of the irial granule.

A term of E.pos-U.pos has a negative value when an average value of y-coordinates of U.crd is below an average value of y-coordinates of E.crd. This means an outline whose average y-coordinate is below the reference outline is not a candidate outline of the counter outline since the reference outline is assumed to be the lower outline of the irial granule. The same is true for a term of E.pos-L.pos.

If the relation of UD1(Tc, Rj)$\geq$UD1(Ti, Rj) (Tinit$\leq$Ti<Tend) wherein UD1(Ti, Rj) shows a maximum when Ti=Tc is satisfied and the relation of LD1(Td, RJ)$\geq$LD1(Ti, Rj) (Tinit$\leq$Ti<Tend) wherein LD1(Ti, Rj) shows a maximum when Ti=Td is satisfied, then the greater of UD1 and LD1 and a set of coordinates corresponding thereto are substituted into C1(Rj). Note that C1(Rj) is a candidate line of the upper outline of the irial granule under the condition that the reference outline is the lower outline of the irial granule.

Specifically, as shown in (b) of the table II in FIG. 30, if UD1(Tc, Rj)$\geq$LD1(Td, Rj), then values of UD1 and U.crd in the threshold value Tc are substituted, while if UD1(Tc, Rj)<LD1(Td, Rj), then values of LD1 and L.crd in the threshold value Td are substituted. Note that C1.crd(Rj) and C1.diff(Rj) in the table II indicate a set of dots representing a candidate line of the upper outline of the irial granule and a score thereof, respectively.

[3]-2-(2) Assume that the reference outline is the upper outline of the irial granule In one of the image segments Rj ($0 \geq j < N$), UD2(Ti, Rj) and LD2(Ti, Rj), as shown in (a) of the table III in FIG. 31, are determined with respect to Tinit$\leq$Ti<Tmax. Note that UD2(Ti, Rj) and LD2(Ti, Rj) represent scores of the uppermost outline and the lowermost outline under the condition that the reference outline is the upper outline of the irial granule.

A term of U.pos-E.pos has a negative value when an average value of y-coordinates of U.crd is above an average value of y-coordinates of E.crd. This means an outline whose average y-coordinate is above the reference outline is not a candidate outline of the counter outline since the reference outline is assumed to be the upper outline of the irial granule. The same is true for a term of L.pos-E.pos.

If the relation of UD2(Te, Rj)≧UD1(Ti, Rj) (Tinit≦Ti<Tend) wherein UD2(Ti, Rj) shows a maximum when Ti=Te is satisfied and the relation of LD2(Tf, RJ)≧LD2(Ti, Rj) (Tinit≦Ti<Tend) wherein LD2(Ti, Rj) shows a maximum when Ti=Tf is satisfied, then the greater of UD2 and LD2 and a set of coordinates corresponding thereto are substituted into C2(Rj). Note that C2(Rj) is a candidate line of the lower outline of the irial granule under the condition that the reference outline is the upper outline of the irial granule.

Specifically, as shown in (b) of the table III in FIG. 31, if UD2(Te, Rj)≧LD2(Tf, Rj), then values of UD2 and U.crd in the threshold value Te are substituted, while if UD2(Te, Rj)<LD2(Tf, Rj), then values of LD2 and L.crd in the threshold value Tf are substituted. Note that C2.crd(Rj) and C2.diff(Rj) in the table III indicate a set of dots representing a candidate line of the lower outline of the irial granule and a score thereof, respectively.

[3]-2-(3) Determination of Counter Outline

The counter outline is determined based on whether the candidate outline extracted in [3]-2-(1) is greater than that in [3]-2-(2). Specifically, if C1.diff(Rj)≧C2.diff(Rj), as shown in (a) of the table IIII in FIG. 32, then it is determined that the reference outline is the lower outline of the irial granule, and the counter outline is the upper outline of the irial granule. Alternatively, if C1.diff(Rj)<C2.diff(Rj), as shown in (b) of the table IIII, then it is determined that the reference outline is the upper outline of the irial granule, and the counter outline is the lower outline of the irial granule.

The rectangular pupilary image, as described above, consists of an image of the pupil plus right, left, upper, and lower margins, so that a pupilary area dose not exist near both ends (R0, R1 and RN-1, RN-1) of the image segments, in other words, no irial granule exists. Accordingly, an average value Tave of E.thd(Rj) ($0 \leq j < N$) is, as shown in (c) of the table III in FIG. 32, determined, and both ends E1(Tave) and E2(Tave) of an objective area binary-coded using the average value Tave are determined as right and left end dots of the irial granule.

The above operations are performed on all the image segments Rj ($0 \leq j < N$) to derive a set of dots UPPER.crd(Rj) representing the upper outline of the irial granule and a set of dots LOWER.crd(Rj) representing the lower outline of the irial granule. An area defined by UPPER.crd(Rj) and LOWER.crd(Rj) represents the irial granule (step 43).

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An animal identification apparatus comprising:

an outline extracting circuit that extracts from an image of an eye of an animal to be identified including a pupil and an irial granule an outline of said pupil;

an arc application processing circuit that determines an arc approximate to a specified portion of said extracted outline;

an irial granule deforming circuit that deforms the irial granule in said image according to the degree of deformation of said arc up to a reference level; and a storage that registers data on said deformed irial granule of the animal to be registered.

2. An animal identification apparatus as set forth in claim 1, wherein said arc application processing circuit determines said arc in an x-y coordinate system to provide arc data indicating a length, a radius, and an angle of said arc, and wherein said irial granule deforming circuit maps said irial granule into polar coordinates wherein a straight line is defined as said reference level based on said arc data.

3. An animal identification apparatus as set forth in claim 1, further comprising an irial granule identification circuit that compares data on said deformed irial granule of the animal to be identified with said data registered in said storage to determine whether said animal is registered or not based on a correlation between said compared data.

4. An animal identification method comprising the steps of:

extracting from an image of an eye of an animal to be identified including a pupil and an irial granule an outline of said pupil;

applying an approximate arc to a specified portion of said extracted outline;

deforming the irial granule in said image according to the degree of deformation of said arc up to a reference level; and registering data on said deformed irial granule of the animal in a storage.

5. An animal identification apparatus as set forth in claim 4, wherein arc data indicating a length, a radius, and an angle of said arc is determined to map said irial granule into polar coordinates wherein a straight line is defined as said reference level based on said arc data.

* * * * *